(12) United States Patent
Merrill et al.

(10) Patent No.: US 8,820,789 B2
(45) Date of Patent: *Sep. 2, 2014

(54) SEAT HARNESS PRETENSIONER

(71) Applicant: AmSafe, Inc., Phoenix, AZ (US)

(72) Inventors: David T. Merrill, Scottsdale, AZ (US); Todd J. Humbert, Chandler, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,325

(22) Filed: Jun. 25, 2013

(65) Prior Publication Data

US 2014/0167459 A1    Jun. 19, 2014

Related U.S. Application Data

(63) Continuation of application No. 13/109,967, filed on May 17, 2011, now Pat. No. 8,469,401, which is a continuation-in-part of application No. 12/711,235, filed on Feb. 23, 2010, now Pat. No. 8,469,400.

(60) Provisional application No. 61/154,731, filed on Feb. 23, 2009.

(51) Int. Cl.
| | |
|---|---|
| *B60R 22/36* | (2006.01) |
| *B60N 2/68* | (2006.01) |
| *B60N 2/42* | (2006.01) |
| *B60R 22/26* | (2006.01) |
| *B60N 2/24* | (2006.01) |
| *B60R 22/195* | (2006.01) |
| *B60R 22/18* | (2006.01) |
| *B60R 22/02* | (2006.01) |
| *B60R 22/24* | (2006.01) |

(52) U.S. Cl.
CPC ........... *B60R 22/195* (2013.01); *B60R 22/1951* (2013.01); *B60N 2/688* (2013.01); *B60N 2/4242* (2013.01); *B60R 2022/1825* (2013.01); *B60R 2022/027* (2013.01); *B60R 22/24* (2013.01); *B60R 22/26* (2013.01); *B60N 2/24* (2013.01)
USPC ............ 280/806; 280/807; 297/480; 297/484

(58) Field of Classification Search
USPC .................. 280/801.1, 801.2, 804, 806, 807; 297/480, 484
See application file for complete search history.

(56) References Cited

U.S. PATENT DOCUMENTS

| | | |
|---|---|---|
| 906,045 A | 12/1908 | Miller |
| 1,079,080 A | 11/1913 | Ward |

(Continued)

FOREIGN PATENT DOCUMENTS

| | | |
|---|---|---|
| CA | 2038505 | 9/1991 |
| CA | 2091526 | 10/1993 |

(Continued)

OTHER PUBLICATIONS

Britax, "COMPAQ: Convertible Car Seats." Buckle Image. Accessed Oct. 12, 2010. (2 pages). This has been publicly available for at least one year prior to this application's filing date.

(Continued)

*Primary Examiner* — Toan To
(74) *Attorney, Agent, or Firm* — Perkins Coie LLP

(57) ABSTRACT

Various embodiments of seat harness pretensioning devices for use in land, air, and sea vehicles are described herein. In one embodiment, a seat unit for use in a military land vehicle or helicopter includes a stroking device that enables the seat to move downwardly in response to sudden movement. The seat unit also includes a seat belt or harness that extends around the occupant in the seat. Sudden movement of the seat in response to an explosion or hard landing causes a tensioning system to automatically pretension the seat harness.

14 Claims, 13 Drawing Sheets

(56) References Cited

U.S. PATENT DOCUMENTS

| | | |
|---|---|---|
| 1,369,456 A | 2/1922 | Meredith |
| 1,438,898 A | 12/1922 | Carpmill |
| 1,816,262 A | 7/1931 | Ritter |
| 1,930,378 A | 10/1933 | Beagan |
| 2,132,556 A | 10/1938 | Blackshaw |
| 2,372,557 A | 3/1945 | Dowd |
| 2,437,585 A | 3/1948 | Zimmern |
| 2,482,693 A | 9/1949 | Rogers et al. |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,710,999 A | 6/1955 | Davis |
| 2,763,451 A | 9/1956 | Moran |
| 2,803,864 A | 8/1957 | Bishaf |
| 2,845,233 A | 7/1958 | Wrighton |
| 2,846,745 A | 8/1958 | Lathrop |
| 2,869,200 A | 1/1959 | Phillips et al. |
| 2,876,516 A | 3/1959 | Cummings |
| 2,892,232 A | 6/1959 | Quilter |
| 2,893,088 A | 7/1959 | Harper et al. |
| 2,899,732 A | 8/1959 | Cushman |
| 2,901,794 A | 9/1959 | Prete, Jr. |
| 2,938,254 A | 5/1960 | Gaylord |
| 2,964,815 A | 12/1960 | Sereno |
| 2,965,942 A | 12/1960 | Carter |
| 3,029,487 A | 4/1962 | Asai |
| 3,084,411 A | 4/1963 | Lindblad |
| 3,091,010 A | 5/1963 | Davis |
| 3,104,440 A | 9/1963 | Davis |
| 3,110,071 A | 11/1963 | Higuchi |
| 3,118,208 A | 1/1964 | Wexler |
| 3,137,907 A | 6/1964 | Unai |
| D198,566 S | 7/1964 | Holmberg et al. |
| 3,142,103 A | 7/1964 | Lindblad |
| 3,145,442 A | 8/1964 | Brown |
| 3,165,805 A | 1/1965 | Lower |
| 3,178,226 A | 4/1965 | Lorwin |
| 3,179,992 A | 4/1965 | Murphy, Sr. |
| 3,183,568 A | 5/1965 | Gaylord |
| 3,189,963 A | 6/1965 | Warner et al. |
| 3,218,685 A | 11/1965 | Atumi |
| 3,226,791 A | 1/1966 | Carter |
| 3,233,941 A | 2/1966 | Selzer |
| 3,256,576 A | 6/1966 | Klove, Jr. et al. |
| 3,262,169 A | 7/1966 | Jantzen |
| 3,287,062 A | 11/1966 | Board |
| 3,289,261 A | 12/1966 | Davis |
| 3,293,713 A | 12/1966 | Gaylord |
| 3,306,662 A | 2/1967 | Finnigan |
| 3,312,502 A | 4/1967 | Coe |
| 3,369,842 A | 2/1968 | Adams et al. |
| 3,380,776 A | 4/1968 | Dillender |
| 3,414,947 A | 12/1968 | Holmberg et al. |
| 3,428,029 A | 2/1969 | Klickstein |
| 3,451,720 A | 6/1969 | Makinen |
| 3,491,414 A | 1/1970 | Stoffel |
| 3,505,711 A | 4/1970 | Carter |
| 3,523,342 A | 8/1970 | Spires |
| D218,589 S | 9/1970 | Lohr et al. |
| 3,564,672 A | 2/1971 | McIntyre |
| 3,576,056 A | 4/1971 | Barcus |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,658,281 A | 4/1972 | Gaylord |
| 3,673,645 A | 7/1972 | Burleigh |
| 3,678,542 A | 7/1972 | Prete, Jr. |
| 3,695,696 A | 10/1972 | Lohr et al. |
| 3,714,684 A | 2/1973 | Gley |
| 3,744,102 A | 7/1973 | Gaylord |
| 3,744,103 A | 7/1973 | Gaylord |
| 3,760,464 A | 9/1973 | Higuchi |
| 3,766,611 A | 10/1973 | Gaylord |
| 3,766,612 A | 10/1973 | Hattori |
| 3,775,813 A | 12/1973 | Higuchi |
| 3,825,979 A | 7/1974 | Jakob |
| 3,827,716 A | 8/1974 | Vaughn et al. |
| 3,856,351 A | 12/1974 | Garveys |
| 3,879,810 A | 4/1975 | Prete, Jr. et al. |
| 3,898,715 A | 8/1975 | Balder |
| 3,935,618 A | 2/1976 | Fohl et al. |
| 3,964,138 A | 6/1976 | Gaylord |
| 3,986,234 A | 10/1976 | Frost et al. |
| 3,995,885 A | 12/1976 | Plesniarski |
| 4,018,399 A | 4/1977 | Rex |
| 4,026,245 A | 5/1977 | Arthur |
| 4,051,743 A | 10/1977 | Gaylord |
| 4,095,313 A | 6/1978 | Piljay et al. |
| D248,618 S | 7/1978 | Anthony |
| 4,100,657 A | 7/1978 | Minolla |
| 4,118,833 A | 10/1978 | Knox et al. |
| 4,128,924 A | 12/1978 | Happel et al. |
| 4,136,422 A | 1/1979 | Ivanov et al. |
| 4,148,224 A | 4/1979 | Craig |
| 4,181,832 A | 1/1980 | Ueda |
| 4,184,234 A | 1/1980 | Anthony et al. |
| 4,185,363 A | 1/1980 | David |
| 4,196,500 A | 4/1980 | Happel et al. |
| 4,220,294 A | 9/1980 | DiPaola |
| 4,228,567 A | 10/1980 | Ikesue et al. |
| 4,239,260 A | 12/1980 | Hollowell |
| 4,253,623 A | 3/1981 | Steger et al. |
| 4,262,396 A | 4/1981 | Koike et al. |
| 4,273,301 A | 6/1981 | Frankila |
| 4,302,049 A | 11/1981 | Simpson |
| 4,317,263 A | 3/1982 | Fohl |
| 4,321,734 A | 3/1982 | Gandelman |
| 4,334,341 A | 6/1982 | Krautz et al. |
| 4,336,636 A | 6/1982 | Ishiguro et al. |
| 4,366,604 A | 1/1983 | Anthony et al. |
| 4,385,425 A | 5/1983 | Tanaka et al. |
| 4,408,374 A | 10/1983 | Fohl et al. |
| 4,419,874 A | 12/1983 | Brentini |
| 4,425,688 A | 1/1984 | Anthony et al. |
| 4,457,052 A | 7/1984 | Hauber |
| 4,487,454 A | 12/1984 | Biller |
| 4,491,343 A | 1/1985 | Fohl et al. |
| 4,525,901 A | 7/1985 | Krauss |
| 4,545,097 A | 10/1985 | Wier et al. |
| 4,549,769 A | 10/1985 | Pilarski |
| 4,555,831 A | 12/1985 | Otzen et al. |
| 4,569,535 A | 2/1986 | Haglund et al. |
| D285,383 S | 9/1986 | Anthony |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hakansson et al. |
| 4,644,618 A | 2/1987 | Holmberg et al. |
| 4,646,400 A | 3/1987 | Tanaka |
| 4,648,483 A | 3/1987 | Skyba |
| 4,650,214 A | 3/1987 | Higbee |
| 4,651,946 A | 3/1987 | Anthony et al. |
| 4,656,700 A | 4/1987 | Tanaka et al. |
| 4,660,889 A | 4/1987 | Anthony et al. |
| 4,679,852 A | 7/1987 | Anthony et al. |
| 4,682,791 A | 7/1987 | Ernst |
| 4,685,176 A | 8/1987 | Burnside |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,726,625 A | 2/1988 | Bougher |
| 4,727,628 A | 3/1988 | Rudholm |
| 4,733,444 A | 3/1988 | Takada |
| 4,738,485 A | 4/1988 | Rumpf |
| 4,741,574 A | 5/1988 | Weightman et al. |
| 4,742,604 A | 5/1988 | Mazelsky |
| D296,678 S | 7/1988 | Lortz et al. |
| 4,757,579 A | 7/1988 | Nishino et al. |

(56) References Cited

U.S. PATENT DOCUMENTS

| | | |
|---|---|---|
| 4,758,048 A | 7/1988 | Shuman |
| 4,766,654 A | 8/1988 | Sugimoto |
| 4,786,078 A | 11/1988 | Schreier et al. |
| 4,786,080 A | 11/1988 | Jay |
| 4,790,597 A | 12/1988 | Bauer et al. |
| 4,809,409 A | 3/1989 | Van Riesen et al. |
| 4,832,410 A | 5/1989 | Bougher |
| 4,843,688 A | 7/1989 | Ikeda et al. |
| 4,854,607 A | 8/1989 | Mandracchia et al. |
| 4,854,608 A | 8/1989 | Barral et al. |
| D303,232 S | 9/1989 | Lortz et al. |
| 4,876,770 A | 10/1989 | Bougher |
| 4,876,772 A | 10/1989 | Anthony et al. |
| 4,884,652 A | 12/1989 | Vollmer |
| 4,901,407 A | 2/1990 | Pandola et al. |
| 4,903,377 A | 2/1990 | Doty |
| 4,911,377 A | 3/1990 | Lortz et al. |
| 4,919,484 A | 4/1990 | Bougher et al. |
| 4,927,211 A | 5/1990 | Bolcerek |
| 4,934,030 A | 6/1990 | Spinosa et al. |
| 4,940,254 A | 7/1990 | Ueno et al. |
| 4,942,649 A | 7/1990 | Anthony et al. |
| 4,995,640 A | 2/1991 | Saito et al. |
| 5,015,010 A | 5/1991 | Homeier et al. |
| 5,023,981 A | 6/1991 | Anthony et al. |
| 5,026,093 A | 6/1991 | Nishikaji |
| 5,029,369 A | 7/1991 | Oberhardt et al. |
| 5,031,962 A | 7/1991 | Lee |
| 5,038,446 A | 8/1991 | Anthony et al. |
| 5,039,169 A | 8/1991 | Bougher et al. |
| 5,046,687 A | 9/1991 | Herndon |
| 5,050,274 A | 9/1991 | Staniszewski et al. |
| 5,054,815 A | 10/1991 | Gavagan |
| 5,058,244 A | 10/1991 | Fernandez |
| 5,067,212 A | 11/1991 | Ellis |
| 5,074,011 A | 12/1991 | Carlson |
| 5,074,588 A | 12/1991 | Huspen |
| 5,084,946 A | 2/1992 | Lee |
| 5,088,160 A | 2/1992 | Warrick |
| 5,088,163 A | 2/1992 | van Riesen et al. |
| 5,097,572 A | 3/1992 | Warrick |
| D327,455 S | 6/1992 | Blair |
| 5,119,532 A | 6/1992 | Tanaka et al. |
| 5,123,147 A | 6/1992 | Blair |
| 5,123,673 A | 6/1992 | Tame |
| 5,142,748 A | 9/1992 | Anthony et al. |
| 5,159,732 A | 11/1992 | Burke et al. |
| 5,160,186 A | 11/1992 | Lee |
| 5,165,149 A | 11/1992 | Nihei |
| 5,170,539 A | 12/1992 | Lundstedt et al. |
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| 5,234,181 A | 8/1993 | Schroth et al. |
| 5,236,220 A | 8/1993 | Mills |
| 5,248,187 A | 9/1993 | Harrison |
| D342,465 S | 12/1993 | Anthony et al. |
| 5,267,377 A | 12/1993 | Gillis et al. |
| 5,269,051 A | 12/1993 | McFalls |
| 5,272,770 A | 12/1993 | Allen et al. |
| 5,282,672 A | 2/1994 | Borlinghaus |
| 5,282,706 A | 2/1994 | Anthony et al. |
| 5,283,933 A | 2/1994 | Wiseman et al. |
| 5,286,057 A | 2/1994 | Forster |
| 5,286,090 A | 2/1994 | Templin et al. |
| 5,292,181 A | 3/1994 | Dybro |
| 5,301,371 A | 4/1994 | Chao |
| 5,308,148 A | 5/1994 | Peterson et al. |
| 5,311,653 A | 5/1994 | Merrick |
| 5,332,968 A | 7/1994 | Brown |
| 5,350,195 A | 9/1994 | Brown |
| 5,350,196 A | 9/1994 | Atkins |
| 5,369,855 A | 12/1994 | Tokugawa |
| 5,370,333 A | 12/1994 | Lortz et al. |
| 5,375,879 A | 12/1994 | Williams et al. |
| 5,380,066 A | 1/1995 | Wiseman et al. |
| 5,392,535 A | 2/1995 | Van Noy et al. |
| 5,397,171 A | 3/1995 | Leach |
| 5,403,038 A | 4/1995 | McFalls |
| 5,406,681 A | 4/1995 | Olson et al. |
| 5,411,292 A | 5/1995 | Collins et al. |
| 5,416,957 A | 5/1995 | Renzi, Sr. et al. |
| D359,710 S | 6/1995 | Chinni et al. |
| 5,432,987 A | 7/1995 | Schroth |
| 5,435,272 A | 7/1995 | Epstein |
| 5,443,302 A | 8/1995 | Dybro |
| 5,451,094 A | 9/1995 | Templin et al. |
| D364,124 S | 11/1995 | Lortz et al. |
| 5,471,714 A | 12/1995 | Olson et al. |
| 5,495,646 A | 3/1996 | Scrutchfield et al. |
| 5,497,956 A | 3/1996 | Crook |
| 5,511,856 A | 4/1996 | Merrick et al. |
| 5,516,199 A | 5/1996 | Crook et al. |
| 5,526,556 A | 6/1996 | Czank |
| 5,540,403 A | 7/1996 | Standley |
| 5,560,565 A | 10/1996 | Merrick et al. |
| 5,561,891 A | 10/1996 | Hsieh et al. |
| 5,566,431 A | 10/1996 | Haglund |
| 5,568,676 A | 10/1996 | Freeman |
| 5,570,933 A | 11/1996 | Rouhana et al. |
| 5,579,785 A | 12/1996 | Bell |
| 5,584,107 A | 12/1996 | Koyanagi et al. |
| 5,588,189 A | 12/1996 | Gorman et al. |
| 5,606,783 A | 3/1997 | Gillis et al. |
| 5,622,327 A | 4/1997 | Heath et al. |
| 5,628,548 A | 5/1997 | Lacoste |
| 5,634,664 A | 6/1997 | Seki et al. |
| 5,640,468 A | 6/1997 | Hsu |
| 5,669,572 A | 9/1997 | Crook |
| 5,695,243 A | 12/1997 | Anthony et al. |
| 5,699,594 A | 12/1997 | Czank et al. |
| D389,426 S | 1/1998 | Merrick et al. |
| 5,722,689 A | 3/1998 | Chen et al. |
| 5,743,597 A | 4/1998 | Jessup et al. |
| 5,765,774 A | 6/1998 | Maekawa et al. |
| 5,774,947 A | 7/1998 | Anscher |
| 5,779,319 A | 7/1998 | Merrick |
| D397,063 S | 8/1998 | Woellert et al. |
| 5,788,281 A | 8/1998 | Yanagi et al. |
| 5,788,282 A | 8/1998 | Lewis |
| 5,794,878 A | 8/1998 | Carpenter et al. |
| 5,806,148 A | 9/1998 | McFalls et al. |
| 5,813,097 A | 9/1998 | Woellert et al. |
| 5,839,793 A | 11/1998 | Merrick et al. |
| 5,857,247 A | 1/1999 | Warrick et al. |
| 5,873,599 A | 2/1999 | Bauer et al. |
| 5,873,635 A | 2/1999 | Merrick |
| 5,882,084 A | 3/1999 | Verellen et al. |
| D407,667 S | 4/1999 | Homeier |
| 5,908,223 A | 6/1999 | Miller |
| 5,915,630 A | 6/1999 | Step |
| 5,934,760 A | 8/1999 | Schroth |
| D416,827 S | 11/1999 | Anthony et al. |
| 5,979,026 A | 11/1999 | Anthony |
| 5,979,982 A | 11/1999 | Nakagawa |
| 5,996,192 A | 12/1999 | Haines et al. |
| 6,003,899 A | 12/1999 | Chaney |
| 6,017,087 A | 1/2000 | Anthony et al. |
| 6,056,320 A | 5/2000 | Khalifa et al. |
| 6,065,367 A | 5/2000 | Schroth et al. |
| 6,065,777 A | 5/2000 | Merrick |
| 6,123,388 A | 9/2000 | Vits et al. |
| 6,182,783 B1 | 2/2001 | Bayley |
| RE37,123 E | 4/2001 | Templin et al. |
| 6,224,154 B1 | 5/2001 | Stoki |
| 6,230,370 B1 | 5/2001 | Nelsen |
| 6,260,884 B1 | 7/2001 | Bittner et al. |
| 6,295,700 B1 | 10/2001 | Plzak |
| 6,309,024 B1 | 10/2001 | Busch |
| 6,312,015 B1 | 11/2001 | Merrick et al. |

(56) References Cited

U.S. PATENT DOCUMENTS

| | | |
|---|---|---|
| 6,315,232 B1 | 11/2001 | Merrick |
| 6,322,140 B1 | 11/2001 | Jessup et al. |
| 6,322,149 B1 | 11/2001 | Conforti et al. |
| 6,325,412 B1 | 12/2001 | Pan et al. |
| 6,328,379 B1 | 12/2001 | Merrick et al. |
| 6,343,841 B1 | 2/2002 | Gregg et al. |
| 6,351,717 B2 | 2/2002 | Lambrecht |
| 6,357,790 B1 | 3/2002 | Swann et al. |
| 6,358,591 B1 | 3/2002 | Smith |
| 6,363,591 B1 | 4/2002 | Bell et al. |
| 6,367,882 B1 | 4/2002 | Van Druff et al. |
| 6,374,168 B1 | 4/2002 | Fujii |
| 6,400,145 B1 | 6/2002 | Chamings et al. |
| 6,412,863 B1 | 7/2002 | Merrick et al. |
| 6,418,596 B2 | 7/2002 | Haas et al. |
| 6,425,632 B1 | 7/2002 | Anthony et al. |
| 6,442,807 B1 | 9/2002 | Adkisson |
| 6,446,272 B1 | 9/2002 | Lee et al. |
| 6,463,638 B1 | 10/2002 | Pontaoe |
| 6,467,849 B1 | 10/2002 | Deptolla et al. |
| 6,485,057 B1 | 11/2002 | Midorikawa et al. |
| 6,485,098 B1 | 11/2002 | Vits et al. |
| 6,508,515 B2 | 1/2003 | Vits et al. |
| 6,513,208 B1 | 2/2003 | Sack et al. |
| 6,520,392 B2 | 2/2003 | Thibodeau et al. |
| 6,543,101 B2 | 4/2003 | Sack et al. |
| 6,547,273 B2 | 4/2003 | Grace et al. |
| 6,560,825 B2 | 5/2003 | Maciejczyk et al. |
| 6,566,869 B2 | 5/2003 | Chamings et al. |
| 6,588,077 B2 | 7/2003 | Katsuyama et al. |
| 6,592,149 B2 | 7/2003 | Sessoms |
| 6,606,770 B1 | 8/2003 | Badrenas Buscart |
| 6,619,753 B2 | 9/2003 | Takayama |
| 6,631,926 B2 | 10/2003 | Merrick et al. |
| 6,665,912 B2 | 12/2003 | Turner et al. |
| 6,694,577 B2 | 2/2004 | Di Perrero et al. |
| 6,711,790 B2 | 3/2004 | Pontaoe |
| 6,719,233 B2 | 4/2004 | Specht et al. |
| 6,719,326 B2 | 4/2004 | Schroth et al. |
| 6,722,601 B2 | 4/2004 | Kohlndorfer et al. |
| 6,722,697 B2 | 4/2004 | Krauss et al. |
| 6,733,041 B2 | 5/2004 | Arnold et al. |
| 6,739,541 B2 | 5/2004 | Palliser et al. |
| 6,749,150 B2 | 6/2004 | Kohlndorfer et al. |
| 6,763,557 B2 | 7/2004 | Steiff et al. |
| 6,769,157 B1 | 8/2004 | Meal |
| 6,786,294 B2 | 9/2004 | Specht et al. |
| 6,786,510 B2 | 9/2004 | Roychoudhury et al. |
| 6,786,511 B2 | 9/2004 | Heckmayr et al. |
| 6,793,291 B1 | 9/2004 | Kocher |
| 6,796,007 B1 | 9/2004 | Anscher |
| 6,802,470 B2 | 10/2004 | Smithson et al. |
| 6,820,310 B2 | 11/2004 | Woodard et al. |
| 6,820,902 B2 | 11/2004 | Kim |
| 6,834,822 B2 | 12/2004 | Koning et al. |
| 6,836,754 B2 | 12/2004 | Cooper |
| 6,837,519 B2 | 1/2005 | Moskalik et al. |
| 6,840,544 B2 | 1/2005 | Prentkowski |
| 6,851,160 B2 | 2/2005 | Carver |
| 6,857,326 B2 | 2/2005 | Specht et al. |
| 6,860,671 B2 | 3/2005 | Schulz |
| 6,863,235 B2 | 3/2005 | Koning et al. |
| 6,863,236 B2 | 3/2005 | Kempf et al. |
| 6,868,585 B2 | 3/2005 | Anthony et al. |
| 6,868,591 B2 | 3/2005 | Dingman et al. |
| 6,871,876 B2 | 3/2005 | Xu |
| 6,874,819 B2 | 4/2005 | O'Neill |
| 6,882,914 B2 | 4/2005 | Gioutsos et al. |
| 6,886,889 B2 | 5/2005 | Vits et al. |
| 6,896,291 B1 | 5/2005 | Peterson |
| 6,902,193 B2 | 6/2005 | Kim et al. |
| 6,913,288 B2 | 7/2005 | Schulz et al. |
| 6,916,045 B2 | 7/2005 | Clancy, III et al. |
| 6,921,136 B2 | 7/2005 | Bell et al. |
| 6,922,875 B2 | 8/2005 | Sato et al. |
| 6,931,669 B2 | 8/2005 | Ashline |
| 6,935,701 B1 | 8/2005 | Arnold et al. |
| 6,951,350 B2 | 10/2005 | Heidorn et al. |
| 6,957,789 B2 | 10/2005 | Bowman et al. |
| 6,959,946 B2 | 11/2005 | Desmarais et al. |
| 6,962,394 B2 | 11/2005 | Anthony et al. |
| 6,966,518 B2 | 11/2005 | Kohlndorfer et al. |
| 6,969,022 B2 | 11/2005 | Bell et al. |
| 6,969,122 B2 | 11/2005 | Sachs et al. |
| 6,993,436 B2 | 1/2006 | Specht et al. |
| 6,997,474 B2 | 2/2006 | Midorikawa et al. |
| 6,997,479 B2 | 2/2006 | Desmarais et al. |
| 7,010,836 B2 | 3/2006 | Acton et al. |
| D519,406 S | 4/2006 | Merrill et al. |
| 7,025,297 B2 | 4/2006 | Bell et al. |
| 7,029,067 B2 | 4/2006 | Vits et al. |
| 7,040,696 B2 | 5/2006 | Vits et al. |
| 7,073,866 B1 | 7/2006 | Berdahl |
| 7,077,475 B2 | 7/2006 | Boyle |
| 7,080,856 B2 | 7/2006 | Desmarais et al. |
| 7,083,147 B2 | 8/2006 | Movsesian et al. |
| 7,100,991 B2 | 9/2006 | Schroth et al. |
| 7,108,114 B2 | 9/2006 | Mori et al. |
| 7,118,133 B2 | 10/2006 | Bell et al. |
| 7,131,667 B2 | 11/2006 | Bell et al. |
| 7,137,648 B2 | 11/2006 | Schulz et al. |
| 7,137,650 B2 | 11/2006 | Bell et al. |
| 7,140,571 B2 | 11/2006 | Hishon et al. |
| 7,144,085 B2 | 12/2006 | Vits et al. |
| 7,147,251 B2 | 12/2006 | Bell et al. |
| D535,214 S | 1/2007 | Kolasa |
| 7,159,285 B2 | 1/2007 | Karlsson et al. |
| 7,180,258 B2 | 2/2007 | Specht et al. |
| 7,182,370 B2 | 2/2007 | Arnold |
| 7,210,707 B2 | 5/2007 | Schroth et al. |
| 7,216,827 B2 | 5/2007 | Tanaka et al. |
| 7,219,929 B2 | 5/2007 | Bell et al. |
| 7,232,154 B2 | 6/2007 | Desmarais et al. |
| 7,237,741 B2 | 7/2007 | Specht et al. |
| 7,240,405 B2 | 7/2007 | Webber et al. |
| 7,240,924 B2 | 7/2007 | Kohlndorfer et al. |
| 7,246,854 B2 | 7/2007 | Dingman et al. |
| 7,263,750 B2 | 9/2007 | Keene et al. |
| 7,278,684 B2 | 10/2007 | Boyle |
| D555,358 S | 11/2007 | King |
| 7,300,013 B2 | 11/2007 | Morgan et al. |
| 7,341,216 B2 | 3/2008 | Heckmayr et al. |
| 7,360,287 B2 | 4/2008 | Cerruti et al. |
| 7,367,590 B2 | 5/2008 | Koning et al. |
| 7,377,464 B2 | 5/2008 | Morgan |
| 7,384,014 B2 | 6/2008 | Ver Hoven et al. |
| 7,395,585 B2 | 7/2008 | Longley et al. |
| 7,404,239 B1 | 7/2008 | Walton et al. |
| 7,407,193 B2 | 8/2008 | Yamaguchi et al. |
| D578,931 S | 10/2008 | Toltzman et al. |
| 7,452,003 B2 | 11/2008 | Bell |
| 7,455,256 B2 | 11/2008 | Morgan |
| 7,461,866 B2 | 12/2008 | Desmarais et al. |
| 7,475,840 B2 | 1/2009 | Heckmayr |
| 7,477,139 B1 | 1/2009 | Cuevas |
| 7,481,399 B2 | 1/2009 | Nohren et al. |
| 7,506,413 B2 | 3/2009 | Dingman et al. |
| 7,516,808 B2 | 4/2009 | Tanaka |
| 7,520,036 B1 | 4/2009 | Baldwin et al. |
| D592,543 S | 5/2009 | Kolasa |
| D592,830 S | 5/2009 | Whiteside |
| 7,533,902 B2 | 5/2009 | Arnold et al. |
| 7,547,043 B2 | 6/2009 | Kokeguchi et al. |
| 7,614,124 B2 | 11/2009 | Keene et al. |
| 7,631,830 B2 | 12/2009 | Boelstler et al. |
| 7,669,794 B2 | 3/2010 | Boelstler et al. |
| 7,673,945 B2 | 3/2010 | Riffel et al. |
| 7,698,791 B2 | 4/2010 | Pezza |
| 7,722,081 B2 | 5/2010 | Van Druff et al. |
| 7,739,019 B2 | 6/2010 | Robert et al. |
| 7,753,410 B2 | 7/2010 | Coultrup |
| 7,775,557 B2 | 8/2010 | Bostrom et al. |
| RE41,790 E | 10/2010 | Stanley |
| 7,861,341 B2 | 1/2011 | Ayette et al. |

(56) References Cited

U.S. PATENT DOCUMENTS

| | | | |
|---|---|---|---|
| 7,862,124 | B2 | 1/2011 | Dingman |
| D632,611 | S | 2/2011 | Buscart |
| D637,518 | S | 5/2011 | Chen |
| 7,934,775 | B2 | 5/2011 | Walker et al. |
| 7,945,975 | B2 | 5/2011 | Thomas et al. |
| 8,011,730 | B2 | 9/2011 | Greenwood |
| 8,037,581 | B2 | 10/2011 | Gray et al. |
| 8,096,027 | B2 | 1/2012 | Jung et al. |
| 8,240,012 | B2 | 8/2012 | Walega et al. |
| 8,240,767 | B2 | 8/2012 | Greenwood |
| 8,387,216 | B1 | 3/2013 | Martinson |
| 8,469,400 | B2 * | 6/2013 | Merrill et al. ............ 280/801.1 |
| 8,469,401 | B2 * | 6/2013 | Humbert et al. .......... 280/801.1 |
| 8,567,022 | B2 | 10/2013 | Keene et al. |
| 8,627,554 | B1 | 1/2014 | Hagan et al. |
| 2002/0089163 | A1 | 7/2002 | Bedewi et al. |
| 2002/0135175 | A1 | 9/2002 | Schroth |
| 2002/0145279 | A1 | 10/2002 | Murray |
| 2003/0015863 | A1 | 1/2003 | Brown et al. |
| 2003/0027917 | A1 | 2/2003 | Namiki et al. |
| 2003/0085608 | A1 | 5/2003 | Girardin |
| 2004/0084953 | A1 | 5/2004 | Hansen |
| 2004/0169411 | A1 | 9/2004 | Murray |
| 2004/0174063 | A1 | 9/2004 | Kocher |
| 2004/0217583 | A1 | 11/2004 | Wang |
| 2004/0227390 | A1 | 11/2004 | Schroth |
| 2004/0251367 | A1 | 12/2004 | Suzuki et al. |
| 2005/0073187 | A1 | 4/2005 | Frank et al. |
| 2005/0107932 | A1 | 5/2005 | Bolz et al. |
| 2005/0127660 | A1 | 6/2005 | Liu |
| 2005/0175253 | A1 | 8/2005 | Li et al. |
| 2005/0179244 | A1 | 8/2005 | Schroth |
| 2005/0206151 | A1 | 9/2005 | Ashline |
| 2005/0284977 | A1 | 12/2005 | Specht et al. |
| 2006/0071535 | A1 | 4/2006 | Kim et al. |
| 2006/0075609 | A1 | 4/2006 | Dingman et al. |
| 2006/0097095 | A1 | 5/2006 | Boast |
| 2006/0237573 | A1 | 10/2006 | Boelstler et al. |
| 2006/0243070 | A1 | 11/2006 | Van Druff et al. |
| 2006/0267394 | A1 | 11/2006 | David et al. |
| 2006/0277727 | A1 | 12/2006 | Keene et al. |
| 2007/0080528 | A1 | 4/2007 | Itoga et al. |
| 2007/0241549 | A1 | 10/2007 | Boelstler et al. |
| 2007/0257480 | A1 | 11/2007 | Van Druff et al. |
| 2008/0018156 | A1 | 1/2008 | Hammarskjold et al. |
| 2008/0054615 | A1 | 3/2008 | Coultrup |
| 2008/0093833 | A1 | 4/2008 | Odate |
| 2008/0100051 | A1 | 5/2008 | Bell et al. |
| 2008/0100122 | A1 | 5/2008 | Bell et al. |
| 2008/0136246 | A1 | 6/2008 | Salter |
| 2008/0172847 | A1 | 7/2008 | Keene et al. |
| 2008/0224460 | A1 | 9/2008 | Erez |
| 2009/0014991 | A1 | 1/2009 | Smyth et al. |
| 2009/0069983 | A1 | 3/2009 | Humbert et al. |
| 2009/0179412 | A1 | 7/2009 | Gray et al. |
| 2009/0183348 | A1 | 7/2009 | Walton et al. |
| 2009/0212549 | A1 | 8/2009 | Jones |
| 2009/0241305 | A1 | 10/2009 | Buckingham |
| 2010/0046843 | A1 | 2/2010 | Ma et al. |
| 2010/0115737 | A1 | 5/2010 | Foubert |
| 2010/0125983 | A1 | 5/2010 | Keene et al. |
| 2010/0146749 | A1 | 6/2010 | Jung |
| 2010/0213753 | A1 | 8/2010 | Humbert |
| 2010/0219667 | A1 | 9/2010 | Merrill et al. |
| 2011/0010901 | A1 | 1/2011 | Holler |
| 2011/0043402 | A1 | 2/2011 | Sasakawa |
| 2011/0057500 | A1 | 3/2011 | Walker et al. |
| 2012/0242134 | A1 | 9/2012 | Siegel |
| 2012/0292893 | A1 | 11/2012 | Baca et al. |
| 2013/0127229 | A1 | 5/2013 | Humbert |

FOREIGN PATENT DOCUMENTS

| | | |
|---|---|---|
| CA | 2112960 | 7/1994 |
| CA | 2450744 | 2/2003 |
| DE | 4019402 | 12/1991 |
| DE | 4421688 | 12/1995 |
| DE | 69019765 | 2/1996 |
| EP | 26564 | 4/1981 |
| EP | 0363062 | 4/1990 |
| EP | 0380442 | 8/1990 |
| EP | 0401455 | 12/1990 |
| EP | 0404730 | 12/1990 |
| EP | 0449772 | 10/1991 |
| EP | 0519296 | 12/1992 |
| EP | 0561274 | 9/1993 |
| EP | 0608564 | 8/1994 |
| EP | 1153789 | 11/2001 |
| EP | 1447021 | 8/2004 |
| FR | 1298012 | 7/1962 |
| GB | 888436 | 1/1962 |
| GB | 1047761 | 11/1966 |
| GB | 1582973 | 1/1981 |
| GB | 2055952 | 3/1981 |
| GB | 2356890 | 6/2001 |
| JP | 52055120 | 5/1977 |
| JP | 63141852 U | 9/1988 |
| JP | 63247150 | 10/1988 |
| JP | 10119611 | 5/1998 |
| JP | 2001138858 | 5/2001 |
| WO | WO-8603386 | 6/1986 |
| WO | WO-03009717 | 2/2003 |
| WO | WO-2004004507 | 1/2004 |
| WO | WO-2006041859 | 4/2006 |
| WO | WO-2010/027853 | 3/2010 |

OTHER PUBLICATIONS

"ExxonMobil Santoprene 221-55 Thermoplastic Elastomer" materials sheet. Retrieved from http://www.matweb.com/search/datasheet.aspx?matguid=67de0de851854bb085afcfac35e294f5&ckck=1 on Jul. 8, 2013.

ASTM D395-03 (Reapproved 2008) "Standard Test Methods for Rubber Property—Compression Set", Retrieved from http://enterprise2.astm.org/DOWNLOAD/D395.1656713-1.pdf on Jul. 9, 2013.

Holmbergs, "Group 1 Systems." Accessed Sep. 15, 2010. www.holmbergs.se. (1 page).

Holmbergs, "Infant buckle with steel tongues." Accessed Sep. 15, 2010. www.holmbergs.se. (1 page).

Holmbergs, "Infant buckle. 5-point with plastic chassi and plastic tongues." Accessed Sep. 15, 2010. www.holmbergs.se. (1 page).

Global Seating Systems LLC, "CCOPS," Cobra: Soldier Survival System, 1 page, undated.

Holmbergs, "Art.No. 63/4959-XX and 63/4958-XX GR.1 Buckle, 3/5 point." Accessed Sep. 15, 2010. www.holmbergs.se. (2 pages).

Holmbergs, "Gr. 0+ 3-point buckle with plastic chassi and tongues." Accessed Sep. 15, 2010. www. holmbergs.se. (1 page).

Holmbergs, "Gr. 1 Buckle, Viking." Accessed Sep. 15, 2010. www.holmbergs.se. (1 page).

Novarace, "DL: Group 1 Buckle." Accessed Sep. 15, 2010. www.novarace.com. (1 page).

Novarace, "GT 3: Group 0 Buckle." Accessed Sep. 15, 2010. www.novarace.com (1 page).

Novarace, "GT 5: Group 0 Buckle." Accessed Sep. 15, 2010. www.novarace.com (1 page).

Novarace, "GT: Group 1 Buckle." Accessed Oct. 8, 2010. www.novarace.com. (1 page).

Novarace, "KMA 1: Group 1 Buckle." Accessed Sep. 15, 2010. www.novarace.com. (1 page).

Sabelt Catalog, "SAB104: Standard tongue hole to facilitate webbing insert," p. 23 (1 page).

Sabelt, "Daphne 0: Fiberglass-plastic buckle with metal pin latch." Accessed Sep. 15, 2010. www.sabelt.com (1 page).

Sabelt, "RO1000: Fiberglass-plastic buckle with metal pin latch." Accessed Sep. 15, 2010. www.sabelt.com (1 page).

(56) References Cited

OTHER PUBLICATIONS

Sabelt, "SAB004: Fiberglass-plastic buckle with metal pin latch." Accessed Sep. 15, 2010. www.sabelt.com. (1 page).
Sabelt, "SABUSA004: Fiberglass-plastic buckle with metal pin latch." Accessed Sep. 15, 2010. www.sabelt.com. (1 page).
Schroth Safety Products, Installation Instructions, HMMWV Gunner restraint, Single Lower with Swivel—M1151, Revision: A, Jul. 28, 2006, pp. 1-10.
Toltzman, Randall and Shaul, Rich; "Buckle Assembly"; U.S. Appl. No. 29/297,210, filed Nov. 6, 2007.

* cited by examiner

SEAT HARNESS PRETENSIONER

CROSS-REFERENCE TO RELATED APPLICATIONS INCORPORATED BY REFERENCE

The present application is a continuation of U.S. patent application Ser. No. 13/109,967, filed May 17, 2011, entitled "SEAT HARNESS PRETENSIONER," which is a continuation-in-part of U.S. patent application Ser. No. 12/711,235, filed Feb. 23, 2010, entitled "SEAT HARNESS PRETENSIONER," which claims priority to U.S. Provisional Patent Application No. 61/154,731, filed Feb. 23, 2009, entitled "SEAT HARNESS PRETENSIONER," the disclosures of which are incorporated herein by reference in their entireties.

TECHNICAL FIELD

The following disclosure is directed generally to the field of personal restraints for use in vehicles and, more particularly, to the field of seat harness pretensioners for use in military land vehicles, air vehicles, and other vehicles.

BACKGROUND

Military land vehicles generally have a three-, four-, or five-point seat/shoulder belt or harness in one or more of the vehicle seats. Civilian vehicles generally have a three-point shoulder belt/lap belt harness. To minimize or reduce injury during a collision or rollover, both military and civilian vehicles have used seat harness pretensioners. In a typical pretensioner, sensors on the vehicle detect the acceleration and/or deceleration forces of a collision or rollover, causing the pretensioners to actuate. The pretensioners then tighten up the seat harness around the seated passenger or driver milliseconds before the actual full impact or rollover. The tightened harness holds the passenger securely into the seat, reducing impact and rebound injuries. These existing pretensioners are relatively complicated designs because they rely on pyrotechnic devices or electric motors operating a belt retractor, each controlled by an electronic trigger.

Many military land vehicles are designed to resist the destructive forces of mines and improvised explosive devices (IEDs). These explosive devices create unique risks to military land vehicles. Detonation of a large explosive device can generate forces on the vehicle exceeding 100 g, causing the vehicle to accelerate violently upwardly. To reduce the forces on the vehicle crew during a detonation, some military vehicles, such as the Joint Light Tactical Vehicle (JLTV), Bradley Fighting Vehicle, and Mine Resistant Ambush Protected Vehicle (MRAP), have blast attenuating seats. Blast attenuating seats are often supported on shock absorbing materials or mounted on a structure, such as a stroking device, that allows the seat to move downward during a blast.

Conventional harness pretensioning techniques are generally not useful with these types of blast attenuating seats, because these seats move relative to the vehicle body during the blast and because the acceleration is largely vertical, rather than horizontal. In addition, conventional harness pretension techniques require the use of pyrotechnic devices, electric retractor motors, or electronic sensors, which can be complicated, costly, and subject to failure due to the harsh operating environment of military vehicles.

Passengers in helicopters are subjected to similar types of extreme forces during crashes or hard landings. Some helicopters also have seats mounted on a stroking device. The engineering challenges presented in harness pretensioning with blast attenuation seats are also present in helicopter seats mounted on stroking devices. Accordingly, it would be advantageous to provide a seat harness pretensioning system for use with vehicle seats that move downwardly to reduce impact on a passenger.

SUMMARY

In one aspect, a seat unit for a land vehicle or helicopter has a stroking device for moving a seat relative to a vehicle in response to an explosion or a hard landing, respectively. A tensioning belt is attached to a seat harness and attached at least indirectly to the vehicle body. Movement of the seat relative to the vehicle in response to an explosion or hard landing automatically pretensions the seat harness.

In another aspect, a seat harness pretensioner includes a seat movably mounted in a vehicle, and a guide member operably coupled to the seat and having a harness slot. The pretensioner includes a harness mounted to the seat at a first mounting point and a second mounting point with a portion of the harness passing over the harness slot. The pretensioner also includes a slidable plate movably mounted to the seat and a coupler between the vehicle and the slidable plate to translate movement of the seat relative to the vehicle into movement of the slidable plate to move the harness into the harness slot to tension the harness.

In another aspect, a seat harness pretensioner includes a seat movably mounted in a vehicle, wherein when the vehicle moves in a first direction the seat is permitted to move in a second direction generally opposite the first direction relative to the vehicle; a first plate mounted to the seat; and a harness mounted to the seat and to the first plate. The pretensioner also includes a second plate movably mounted to the seat between the first plate and the seat, the second plate having an opening, wherein the harness passes over a portion of the seat, through the opening, and over the first plate. The pretensioner also includes a lever configured to transmit movement of the seat relative to the vehicle into downward movement of the second plate relative to the seat and the first plate to pull the harness against the portion of the seat and the first plate to tension the harness.

In yet another aspect, a harness assembly includes a seat mounted in a vehicle, the seat having a stroke defining an upper position and a lower position, the seat being movable between the upper position and the lower position along the stroke. The harness assembly also includes a pretensioner mounted to the seat, including a fixed plate attached to the seat, a slidable plate movably mounted to the fixed plate and having an opening, and a coupler. The coupler can have a first end portion contacting the slidable plate, a second end portion contacting a fixed portion of the vehicle that does not move with the seat as the seat moves along the stroke, and a pivot rotatably attached to the fixed plate, wherein when the seat moves from the upper position to the lower position the fixed portion of the vehicle causes the coupler to rotate about the pivot and cause the second end portion to move the slidable plate relative to the fixed plate. The harness assembly further includes a harness having a web, a first end point, and a second end point. The first end point is fixed to the seat and the second end point is fixed to the fixed plate. The web is positioned over a portion of the seat, passes through the opening in the slidable plate, and passes over the fixed plate. When the seat moves from the upper position to the lower position, the slidable plate moves the web between the portion of the seat and the fixed plate to tension the harness.

Other and further objects and advantages will become apparent from the following description and associated drawings. The description provides examples of how the invention may be configured, and is not intended to describe the limits or scope of the invention, which is set forth in the claims. Features and elements in one embodiment may of course also be used in the other embodiments.

DETAILED DESCRIPTION

The present disclosure describes various embodiments of pretensioning devices for use with personal restraint systems in land, air, and sea vehicles. In one embodiment, for example, a seat unit for use in a land vehicle or helicopter includes a stroking device that enables the seat to move relative to the vehicle in response to an explosion or hard landing. The seat unit also includes a tensioning web or belt attached to a harness that extends around the seat occupant. Movement of the seat relative to the vehicle in response to sudden movement of the vehicle caused by an explosion or hard landing causes the tensioning belt to automatically pretension the seat harness. In various embodiments of the disclosure described herein, seat harness pretensioning systems may be entirely mechanically operated via movement of the seat, with no electrical or pyrotechnic components needed. In other embodiments, however, seat harness pretensioning systems configured in accordance with the present disclosure can include one or more electrical or pyrotechnic components to actuate or otherwise facilitate harness pretensioning in response to movement of the seat.

Certain details are set forth in the following description and in FIGS. 1-11 to provide a thorough understanding of various embodiments of the disclosure. Other details describing well-known structures and systems often associated with vehicle seats, seat stroking devices, web retractors, seat harnesses, and other personal restraint devices. have not been set forth in the following disclosure to avoid unnecessarily obscuring the description of the various embodiments of the present disclosure.

Many of the details, dimensions, angles, and other features shown in the Figures are merely illustrative of particular embodiments of the disclosure. Accordingly, other embodiments can add other details, dimensions, angles, and features without departing from the spirit or scope of the present disclosure. In addition, those of ordinary skill in the art will appreciate that further embodiments of the invention can be practiced without several of the details described below. In the Figures, identical reference numbers identify identical, or at least generally similar, elements.

Figure 1:
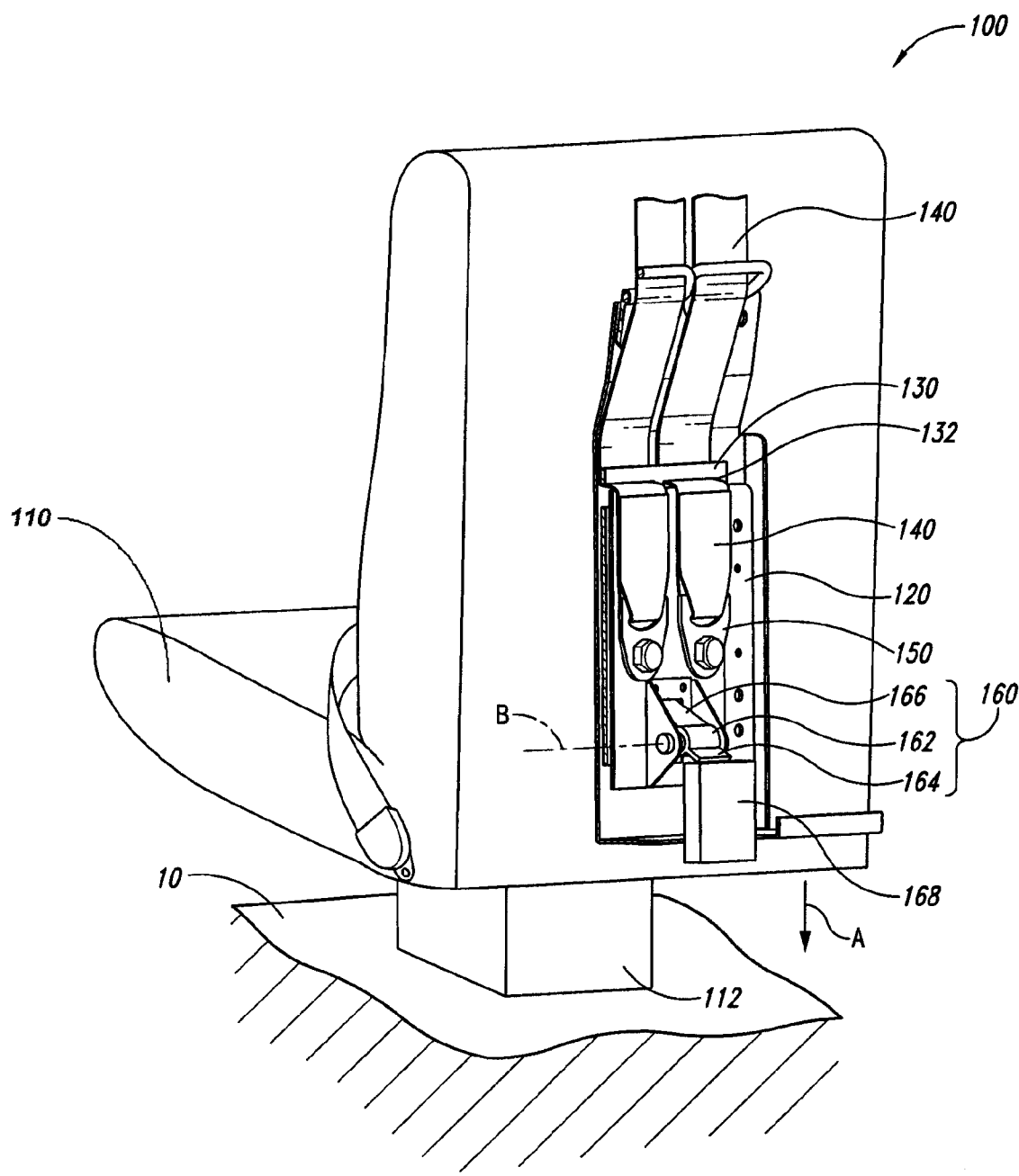
FIG. 1 is partially cross-sectional isometric view of a harness pretensioner configured in accordance with embodiments of the present disclosure.

FIG. 1 is an isometric view of a harness pretensioner assembly 100 according to embodiments of the present disclosure, showing a partial cross-section of certain components of the assembly 100. The assembly 100 includes a seat 110 mounted in a vehicle 10 and movable vertically in response to a sudden impact, explosion, or any other sudden acceleration. The seat 110 can include a stroking mechanism 112 which may be provided in any form that moves the seat vertically relative to the vehicle 10 in the direction of arrow A during a detonation, explosion, or other event that suddenly accelerates the vehicle 10. In some embodiments, the stroking mechanism 112 can be configured to permit the seat 110 to be movable in other directions, such as fore and aft, side to side, or any combination thereof. The stroking mechanism 112 accordingly may be attached to the back, the bottom, or even the sides of the seat 110. In addition, some blast resistant seats are essentially suspended within the vehicle 10. The pretensioners shown in the drawings and described herein may be used with virtually any type of blast resistant seat.

The pretensioner assembly 100 can also include a fixed plate 120 mounted to the seat 110 and a slidable plate 130 movably mounted between the seat 110 and the fixed plate 120. The assembly 100 also includes a harness 140 mounted to the seat 110 and to the fixed plate 120 at an anchor point 150. The slidable plate 130 can include openings 132 through which the harness 140 passes. In some embodiments, the harness 140 extends from the anchor point 150 upward against the fixed plate 120, through the openings 132 in the slidable plate 130, and over a portion of the seat 110. In other embodiments, the harness 140 then passes over a top of the seat 110 and forms shoulder straps of the harness 140. In further embodiments the pretensioner assembly can be used with another portion of the harness 140, such as a lap belt.

The pretensioner assembly 100 can also include a mechanical coupler 160. The coupler 160 can also be described as a lever, a rocker etc. The coupler 160 can have a pivot 162, a first end portion 164, and a second end portion 166. The pivot 162 is pivotally mounted to the fixed plate 120 and allowed to rotate about an axis B generally parallel with a base of the seat 110. In selected embodiments, the first end portion 164 contacts a fixed portion 168 of the vehicle 10. The fixed portion 168 does not move relative to the vehicle 10 when the seat 110 moves along the stroking mechanism 112. The second end portion 166 contacts the slidable plate 130. When the seat 110 moves relative to the vehicle 10, the fixed portion 168 urges the coupler 160 to pivot, and the second end portion 166 causes the slidable plate 130 to move downwardly relative to the fixed plate 120. Because the harness passes through the openings 132 in the slidable plate 130, the slidable plate 130 pulls the harness 140 downward relative to the fixed plate 120 and therefore tensions the harness 140.

Figure 2A:
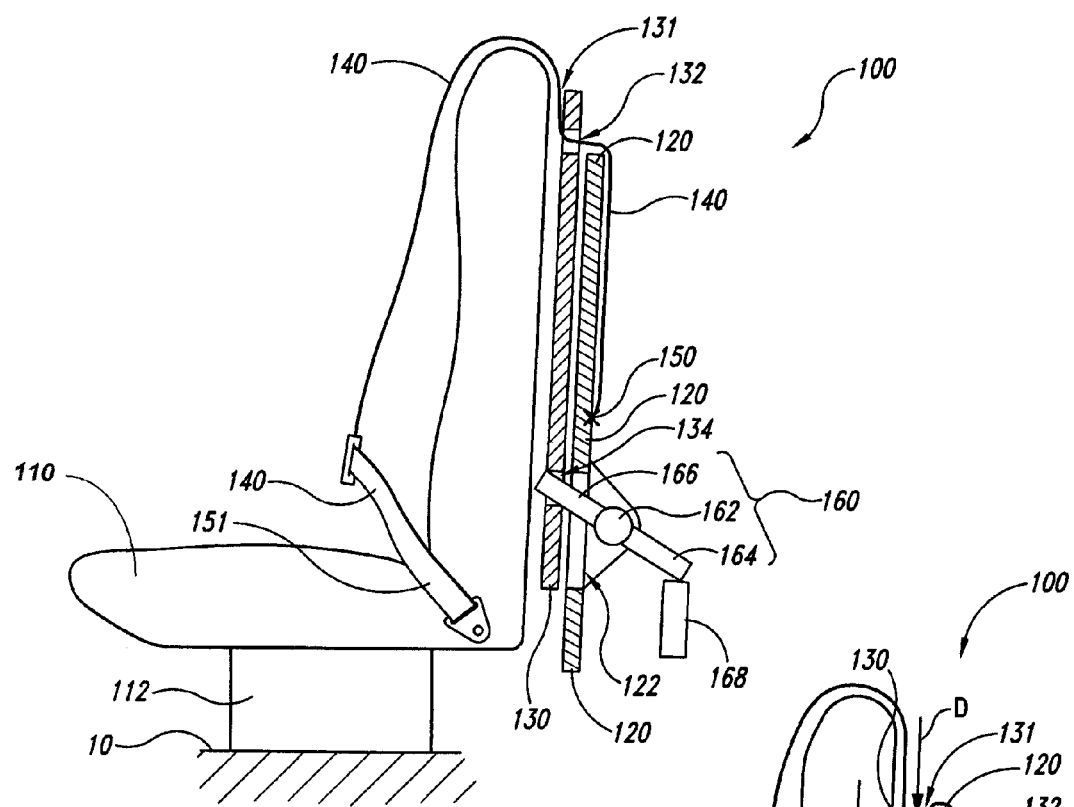
FIG. 2A is a partially schematic side view of a seat and a harness pretensioner in a neutral position configured in accordance with embodiments of the present disclosure.

FIG. 2A is a schematic side view of the pretensioner assembly 100 in a neutral position according to embodiments of the present disclosure. The coupler 160 is fixed relative to the fixed plate 120 but is rotatable around the pivot 162. The first end portion 164 of the coupler 160 contacts the fixed portion 168 of the vehicle 10. In some embodiments the fixed plate 120 includes an opening 122 that receives the second end portion 166 of the coupler 160. In other embodiments the second end portion 166 can extend beyond a lower extent of the fixed plate 120 without passing through an opening. The slidable plate 130 can also include an opening 134 that receives the second end portion 166. The openings 132 in the slidable plate 130 can receive the harness 140 at a point between the anchor 150 and another attachment point 151. In the neutral position, the openings 132 can be aligned with a top of the fixed plate 120 to permit the harness 140 to pass directly through the openings 132 and continue on toward the seat 110. In other terms, a space between the fixed plate 120 and the seat 110 defines a slot 131, into which the slidable plate 130 forces a portion of the harness 140.

Figure 2B:
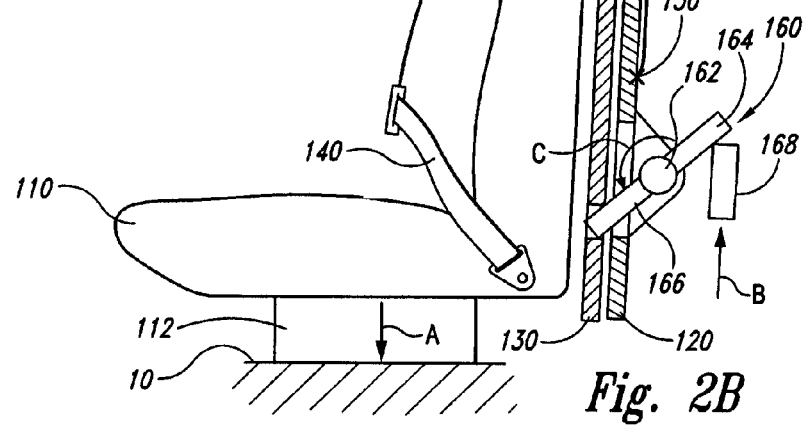
FIG. 2B is a partially schematic side view of the seat and the harness pretensioner of FIG. 2A in a deployed position configured in accordance with embodiments of the present disclosure.

FIG. 2B illustrates a schematic side view of the pretensioner assembly 100 in a deployed position configured in accordance with embodiments of the present disclosure. When the seat 110 moves relative to the vehicle 10 in the direction of arrow A, the fixed portion 168 of the vehicle 10 moves relative to the seat 110 oppositely as shown by the arrow B. This upward relative movement causes the fixed portion 168 to contact the first end portion 164 of the coupler 160 and to rotate the coupler 160 about the pivot 162 as shown by arrow C. When the coupler 160 rotates, the second end portion 166 contacts the slidable plate 130 and urges the slidable plate 130 to move downward relative to the fixed plate 120 as shown by arrow D. When the slidable plate 130 moves downward relative to the fixed plate 120 and relative to the seat 110, the openings 132 pull the harness 140 downward against the fixed plate 120 and the seat 110 and into the slot 131 to tension the harness 140. A ratchet system (described more fully below) or equivalent mechanism can be used to maintain the tension in the harness 140.

In some embodiments the pretensioner assembly 100 tensions the harness 140 by shortening the effective length of the harness 140. In the illustrated embodiments the slidable plate 130 has a path of distance, L. The slidable plate 130 and the harness 140 act similar to a pulley and therefore the harness 140 is shortened by approximately 2L. In other embodiments, this relationship can be different. For example, in some embodiments the assembly 100 can include multiple slidable plates 130 with a similar arrangement, in which case the harness 140 is shortened by more than 2L. Other mechanical relationships are possible. The path of the slidable plate 130 is also dependent upon the relative length of the first end portion 164 and the second end portion 166. The shorter the first end portion 164, the more leverage the fixed portion 168 can exert upon the coupler 160. The longer the second end portion 166, the farther the slidable plate 130 will move when the coupler 160 is actuated. Different designs may call for different dimensions for these various components.

Figure 3:
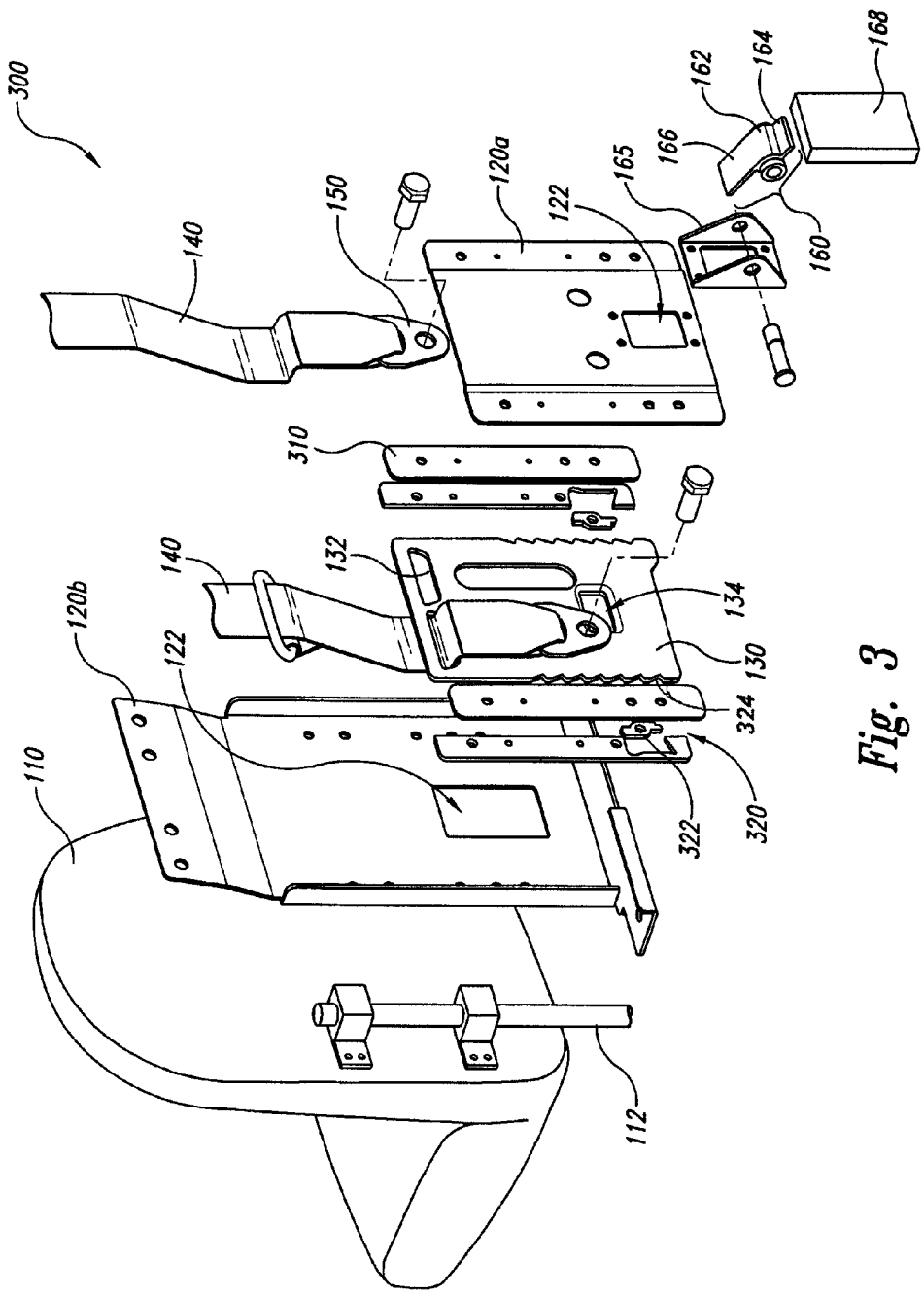
FIG. 3 is an exploded view of components of a harness pretensioner configured in accordance with the present disclosure.

FIG. 3 is an exploded view of a pretensioner assembly 300 according to further embodiments of the present disclosure. Similar to the embodiments discussed above, the assembly 300 can include a seat 110 and a stroking mechanism 112. The assembly 300 can include a first fixed plate 120a and a second fixed plate 120b. The second fixed plate 120b can be mounted to the seat 110, and the first fixed plate 120a can be mounted to the second fixed plate 120b. The assembly 300 can include a slidable plate 130 movably mounted between the first fixed plate 120a and the second fixed plate 120b. The fixed plates 120a, 120b can both include an opening 122 to receive the second end portion 166 and to permit the second end portion 166 to move the slidable plate 130 as discussed above. The fixed plates 120a, 120b can include a track 310 upon which the slidable plate 130 moves up and down relative to the fixed plates 120a, 120b. The harness 140, the anchor point 150, and the coupler 160 can operate substantially as described above with reference to FIGS. 1-2B.

In some embodiments, the track 310 can include a ratchet system 320, including a spring-loaded ratchet 322 and teeth 324 along the fixed plate 130. In other embodiments, the teeth 324 can be on the track 310. When the seat 110 moves along the path, the slidable plate 130 is moved downward relative to the fixed plates 120a, 120b. The ratchet 322 can engage the teeth 324 to maintain the slidable plate 130 in the deployed position relative to the track 310 to maintain the tension in the harness 140. The assembly 300 can also include a load limiter (not shown) that prevents the harness 140 from tensioning beyond a predefined level to avoid harming the occupant. In some embodiments, the load limiter can comprise a mechanical stop that limits the path of the slidable plate 130. In other embodiments, the load limiter is incorporated into the ratchet system 320.

Figure 4:
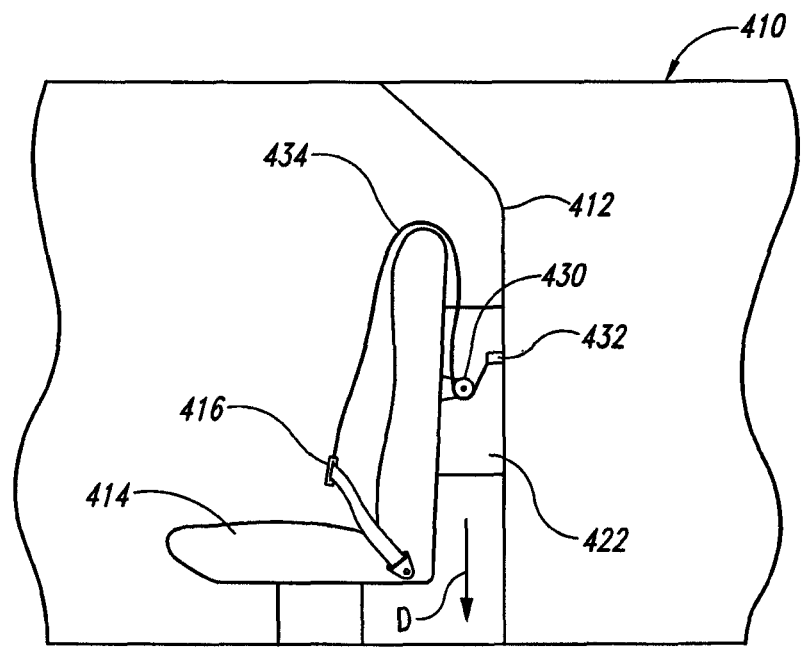
FIG. 4 is a schematic side view of a seat harness pretensioner configured in accordance with an embodiment of the present disclosure.

FIG. 4 is a schematic side view of a seat harness pretensioning system configured in accordance with an embodiment of the disclosure. In this embodiment, a seat 414 is supported by a stroking mechanism 422 on the body 412 of a vehicle 410. The seat 414 and stroking mechanism 422 form a blast resistant seat. The stroking mechanism 422 may be provided in any form that moves the seat downwardly (in the direction of the arrow A in FIG. 4) during a detonation, explosion, or other event that accelerates the vehicle 410 upwardly. The stroking mechanism accordingly may be attached to the back, bottom, or even the sides of the seat. In addition, some blast resistant seats are essentially suspended within the body 412 of the vehicle. The pretensioners shown in the drawings and described herein may be used with virtually any type of blast resistant seat.

A seat harness 416 is attached to the seat 414. The seat harness 416 is typically a three, four or five point harness assembly having webs or belts extending over the seat occupant's hips and shoulders. A front end of a tensioning member or belt 434 is attached to the harness 416. The tensioning belt 434 extends around a seat roller 430 rotatably mounted on the back of the seat 414, and a back end of the tensioning belt 434 is tied off to an anchor 432 on the vehicle body 412.

Referring still to FIG. 4, in use, during a detonation, as the vehicle body 412 accelerates upwardly, the stroking mechanism 422 moves the seat downwardly, as is well known with blast resistant seats. As the seat 414 moves downwardly relative to the vehicle body 412, the seat roller 430 moves down with the seat 414, while the back end of the tensioning belt 434 remains fixed in place on the vehicle body. Consequently, the tensioning belt 434 pulls the seat harness 416 up, placing the seat harness 416 in tension. The harness 416 is accordingly pretensioned during the blast event. The harness 416 remains in tension until the stroking mechanism moves back up to its original position. In other embodiments, it is contemplated that the roller 430 can be replaced with a suitable guide that lets the tensioning belt 434 slide therethrough in response to movement of the seat 414 relative to the vehicle body 412.

Figure 5:
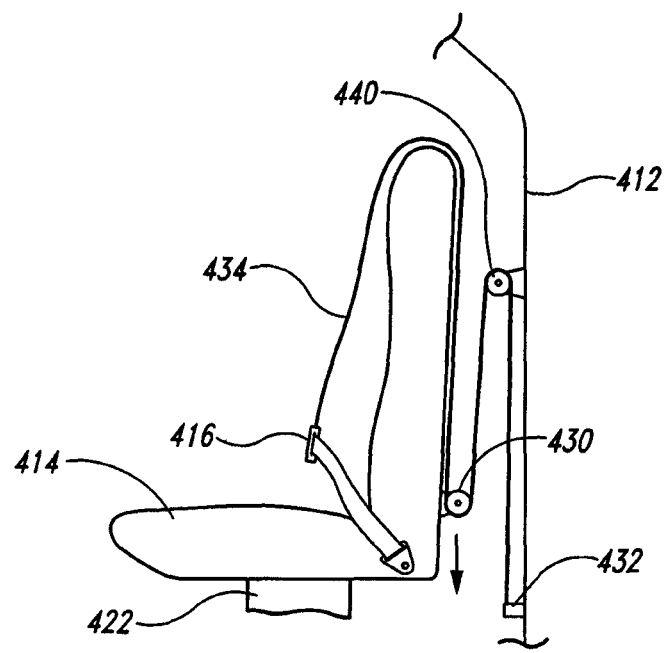
FIG. 5 is a schematic side view of a seat harness pretensioner configured in accordance with another embodiment of the present disclosure.

FIG. 5 is a schematic side view of a seat harness pretensioning system configured in accordance with another embodiment of the disclosure. The embodiment illustrated in FIG. 5 is similar to the design shown in FIG. 4, but further including an anchor roller 440 on the vehicle body 412. The tensioning belt 434 passes around the seat roller 430 and the anchor roller 440, with the back end of the tensioning belt 434 attached to an anchor 432 on the vehicle body, below the anchor roller 440. In this design, the rollers 430 and 440 form a pulley arrangement that increases the tensioning pull force on the tensioning belt 434 while acting over a shorter distance. The tensioning belt 434, one or both rollers 430 and 440, and the anchor 432 form means for pretensioning the harness with downward movement of the seat.

Figure 6A:
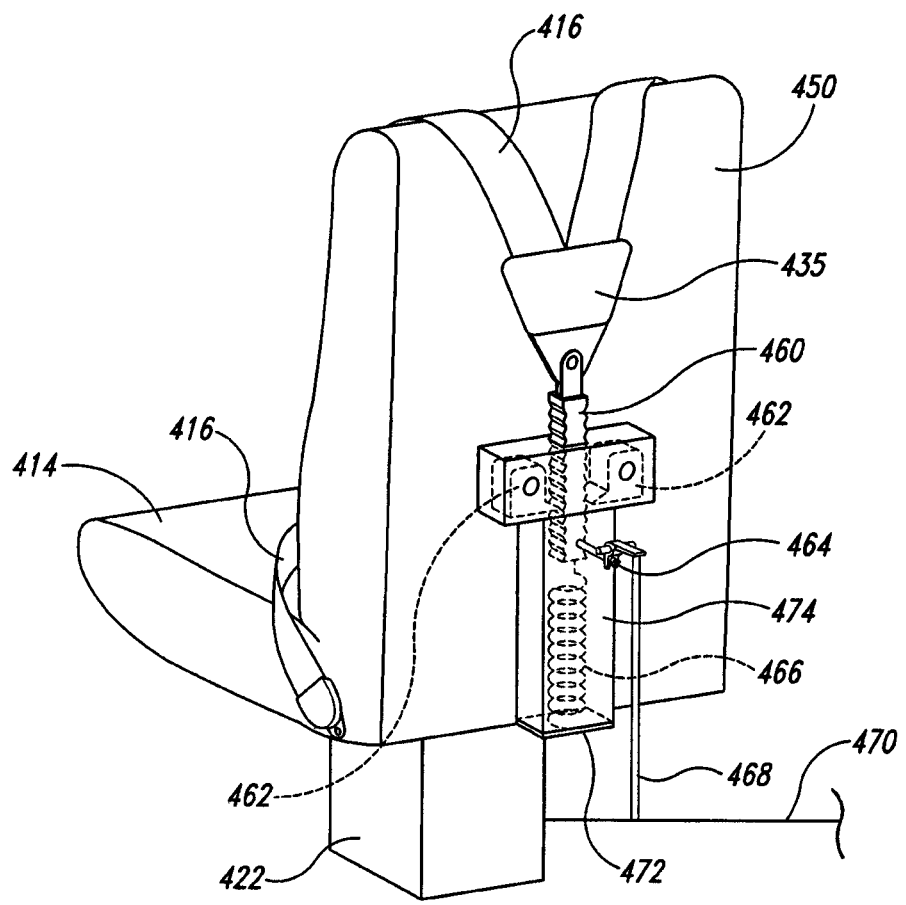
FIGS. 6A-6F are a series of perspective views of seat harness pretensioning apparatuses and systems configured in accordance with further embodiments of the present disclosure.

FIG. 6A is a perspective view of a seat harness pretensioning system configured in accordance with a further embodiment of the disclosure. FIG. 6A shows a third design with the harness 416, or a tensioning belt section 435 joined to the harness 416, attached to a tensioning bar 460. The tensioning bar 460 may have teeth, slots or grooves on one or both sides. In the design shown in FIG. 6A, the teeth are on both sides of the tensioning bar 460. A ratchet 462 engages with the teeth on the tensioning bar 460. This allows the tensioning bar to move down, but not up. The two ratchets 462 shown in FIG. 6 may be spring biased against the tensioning bar 460. A biasing member or tension spring 466 (e.g., a coil spring) extends between a base plate 472 at the back of the seat 414 and the tensioning bar 460. The spring 466 exerts a downward force on the tensioning bar 460. A trigger pin 464 extending into or through a spring guide 474 holds the tensioning bar 460 in place against the downward force exerted by the spring 466. A trigger pin actuator or link 468 is operably coupled to, or in contact with, the trigger pin 464 and the floor 470 or body 412 of the vehicle.

In operation, the stroking mechanism 422 enables the seat 414 to move downwardly in response to a detonation or similar event. This causes the trigger pin actuator 468 to push upwardly on the trigger pin 464, which in turn causes the trigger pin 464 to shear off, or pull out from the spring guide 474, releasing the tensioning bar 460. The spring 466 pulls the tensioning bar 460 down rapidly. The tensioning bar 460 pulls the tensioning section 435, which tensions the seat harness 416. Since the tensioning bar 460 can move down several inches in a fraction of a second, even a large amount of slack in the seat harness, if present, can be taken up. The ratchets 462 prevent any significant reverse upward movement of the tensioning bar 460. Accordingly, the harness remains tensioned holding the passenger tightly in the seat 414, until the passenger is released using a release buckle at the front or side of the harness. If desired, the pretensioner in FIG. 6A can be reset by releasing the ratchets, returning the tensioning bar 460 to its original position, and replacing the trigger pin 464 and the trigger pin actuator 468. In other embodiments, the tensioning bar 460 can be released with other devices. For example, in certain embodiments the trigger pin 464 can be retracted by a solenoid that is activated by a sensor.

As used herein, down means generally in the direction of gravity. With the vehicle in a normal upright position, for example, down is shown by the arrow A in FIG. 4. A stroking device is any device or design that moves a seat down, or that allows a seat to move down, during an impact (e.g., an explosion near a ground vehicle or a crash or hard landing in a helicopter), or other acceleration or deceleration event of a sufficient or preset magnitude.

The ratchets 462 may be replaced by various equivalent elements that also allow only one way movement of the tensioning bar 460. Alternatively, the tensioning bar 460 may be designed so that it moves down rapidly, but can move up only very slowly (e.g., after 2-10 seconds), so that the harness is untensioned after the detonation and any subsequent rebound or landing impact. Rollers or pinion gears engaging the tensioning bar and freewheeling in the forward direction and with viscous or drag rotation in the reverse direction may be used for this purpose. In other embodiments, such a tensioning bar can incorporate, for example, a suitable fluid damping system with an appropriate flow valve to allow rapid movement in one direction but much slower movement in the opposite direction.

The tensioning bar 460 may equivalently be replaced by other elements that can cooperate with one way movement devices. For example, the tensioning bar 460 may be replaced with a section of belt webbing, chain, or other one-way mechanical linkage. Similarly, the trigger pin 464 and the trigger pin actuator 468 may be replaced with other elements that hold the harness 416, or the tensioning bar 460 (if used), in place against the force of the spring 466, until the seat 414 moves down in response to a detonation. For example, the trigger pin 464 may be a shear pin that shears off as the seat 414 moves down, allowing the spring force to act to pretension the harness. Alternatively, the trigger pin 464 may be connected to a cable, strap, or other link attached to a sidewall of the vehicle body 412, or other surface that remains fixed in place relative to the vehicle body 412 as the seat 414 moves down. The vehicle body 412 can include portions of the seat that are fixed to the vehicle body (and do not move on the stroking device). The spring 466 may be replaced by another element that exerts tensioning force on the harness, for example an actuator or gas cylinder.

The tensioning bar 460, the spring 466, the trigger 464, and the ratchet 462 or other tensioning bar movement limiter, form means for tensioning the harness with downward movement of the seat 414. In each of the designs described herein, the tensioning belt 434 may of course be made as part of the harness itself, or as apart of the tensioning or pull-down element 460.

Figure 6B:
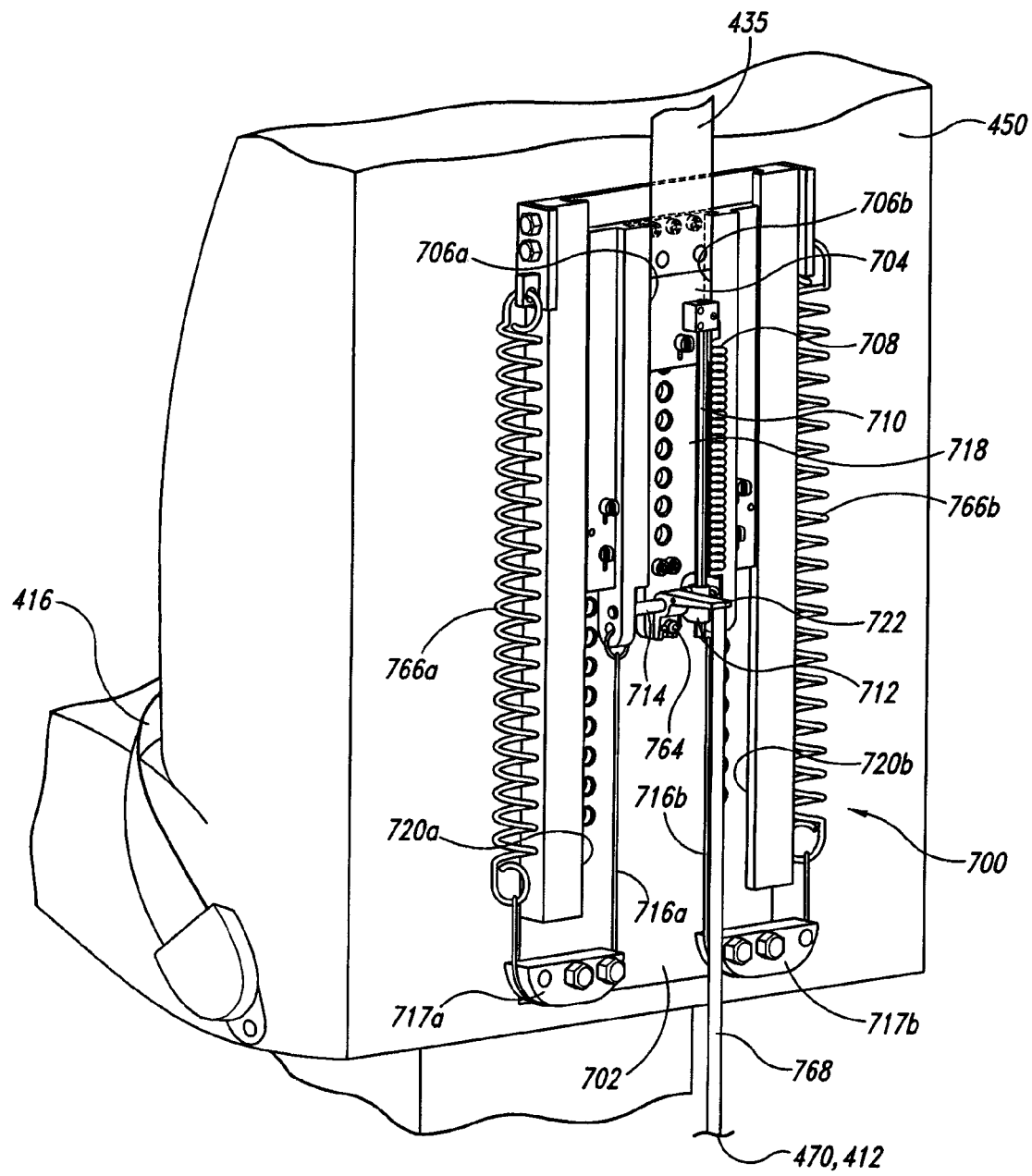

FIGS. 6B-6F are a series of perspective views illustrating various aspects of a seat harness pretensioning system 700 configured in accordance with another embodiment of the disclosure. Referring first to FIG. 6B, in one aspect of this embodiment the tensioning section 435 has a first end portion attached to an upper part of the seat harness 416 (e.g. the shoulder belts) and a second end portion fixedly attached to a first carrier plate 704. The first carrier plate 704 is movably carried in first tracks 706a, 706b formed in a second carrier plate 718. The second carrier plate 718 is carried in second tracks 720a, 720b on a base plate 702. The base plate 702 is mounted on a back portion of the seat 450.

During normal operation, the first carrier plate 704 is configured to slide up and down in the first tracks 706a, 706b under force of a tension spring 708 to maintain some tension or preload in the harness 416. As the first carrier plate 704 moves up and down, an elongate guide member 710 (e.g., a guide rod) extending therefrom slides up and down through a guide fitting 712 supported by the second carrier plate 718, as shown in FIG. 6D.

In the illustrated embodiment, each of two biasing members or tension springs (e.g., coil springs) 766a, 766b has one end portion fixedly attached to an upper side portion of the base plate 702, and a second end portion attached to a corresponding cable 716a, 716b. Each of the cables 716 movably passes around a corresponding cable guide 717 and is attached to a corresponding lug on a lower side region of the second carrier plate 718. The second carrier plate 718 is normally held stationary in the second tracks 720a, 720b against the force of the tension springs 766 by means of a trigger pin 764. As described in greater detail below, however, when the seat 450 strokes downward (under, e.g., an explosion, detonation, etc.), the first carrier plate 304 is locked into position relative to the second carrier plate 718, and the second carrier plate 718 is released and allowed to move downward in the second tracks 720a, 720b under force of the tension springs 766a, 766b, thereby pulling downward on the tensioning section 435 and pretensioning the harness 416.

Figure 6C:
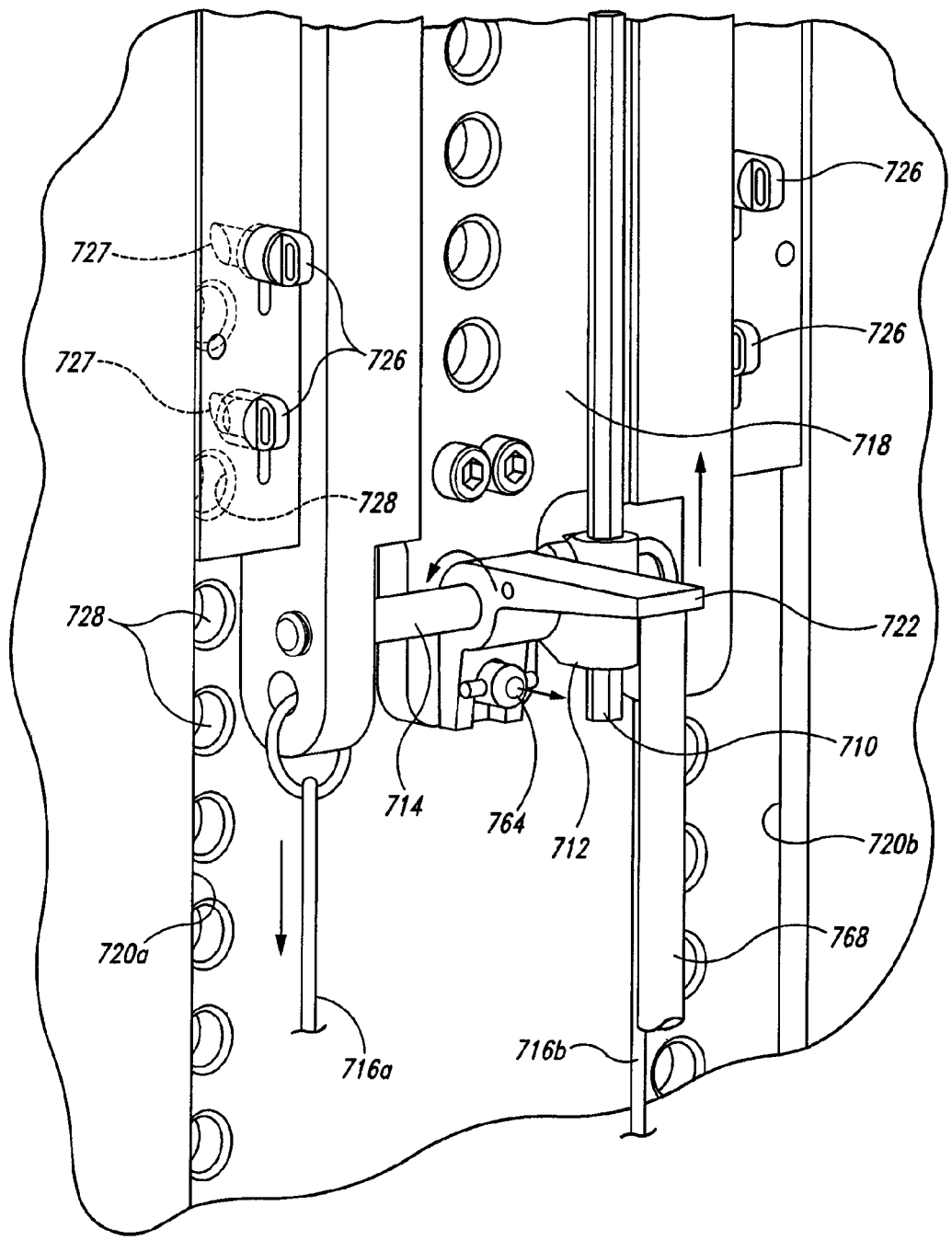
Figure 6D:
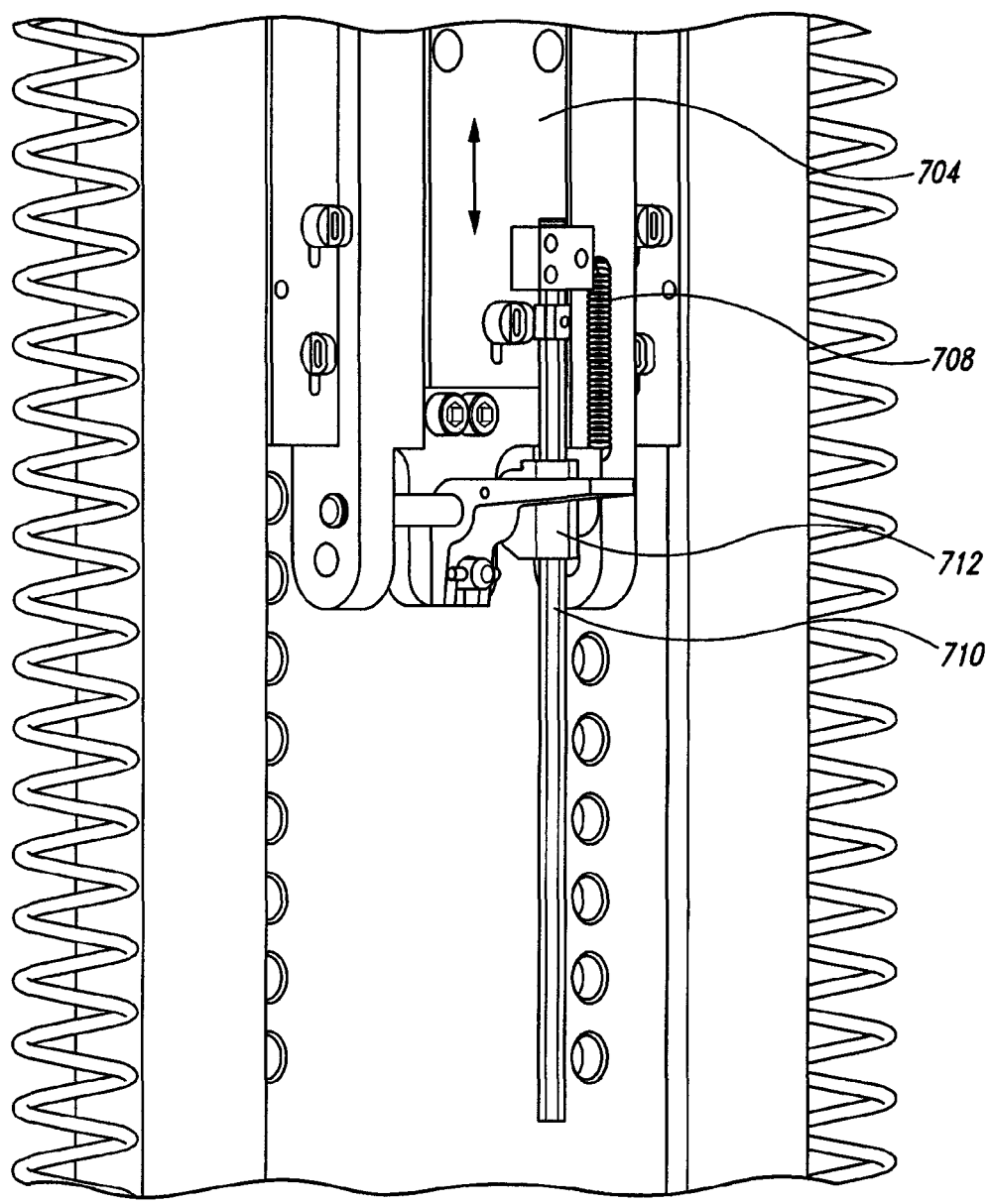

FIG. 6C is an enlarged perspective view illustrating a method of retracting the trigger pin 764 and releasing the second carrier plate 718 from the base plate 702 in accordance with an embodiment of the disclosure. In this embodiment, a pin puller or release arm 722 (e.g. a rocker arm) is pivotally attached to the second carrier plate 718 via a shaft 714. A first forked end portion of the release arm 722 is coupled to an end portion of the trigger pin 764, and a distal second end portion of the release arm 722 is positioned against, or otherwise operably coupled to, a trigger pin actuator (e.g., a push rod) 768 that is supported by the vehicle floor 470 or body 412.

Similar to the embodiment described above with reference to FIG. 6A, in the embodiment of FIG. 6C the stroking mechanism 422 enables the seat 414 to move downwardly in response to a detonation or similar event. This causes the actuator 768 to push upwardly on the distal end portion of the release arm 722, which in turn causes the release arm 722 to rotate about the pivot shaft 714 and pry, lever, or otherwise extract the trigger pin 764 outwardly from a hole or recess (not shown) formed in the base plate 702. This action releases the second carrier plate 718 from the base plate 702 and, as explained below with reference to FIGS. 6E and 6F, this action simultaneously causes the second carrier plate 718 to engage the first carrier plate 704 so that they move downwardly together under force of the tension springs 766.

Figure 6E:
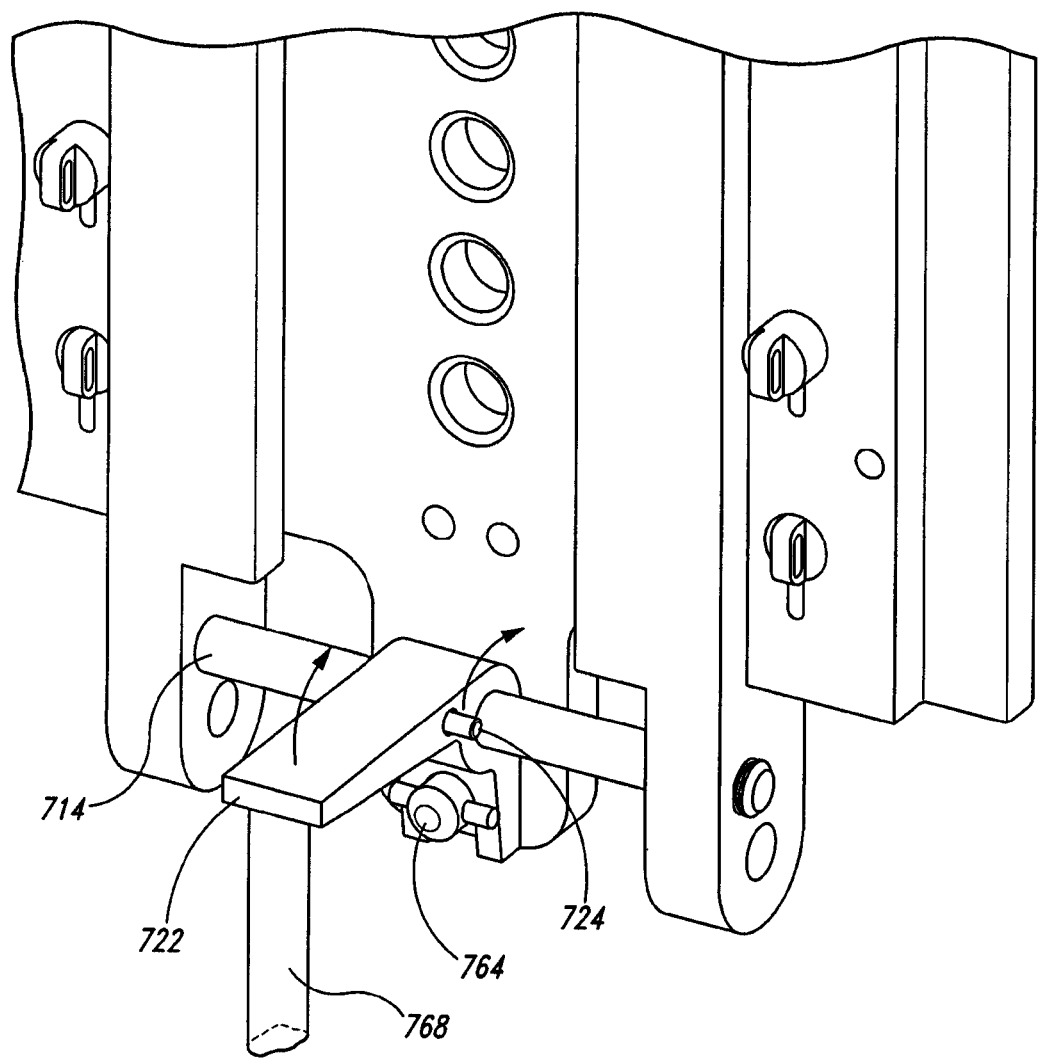
Figure 6F:
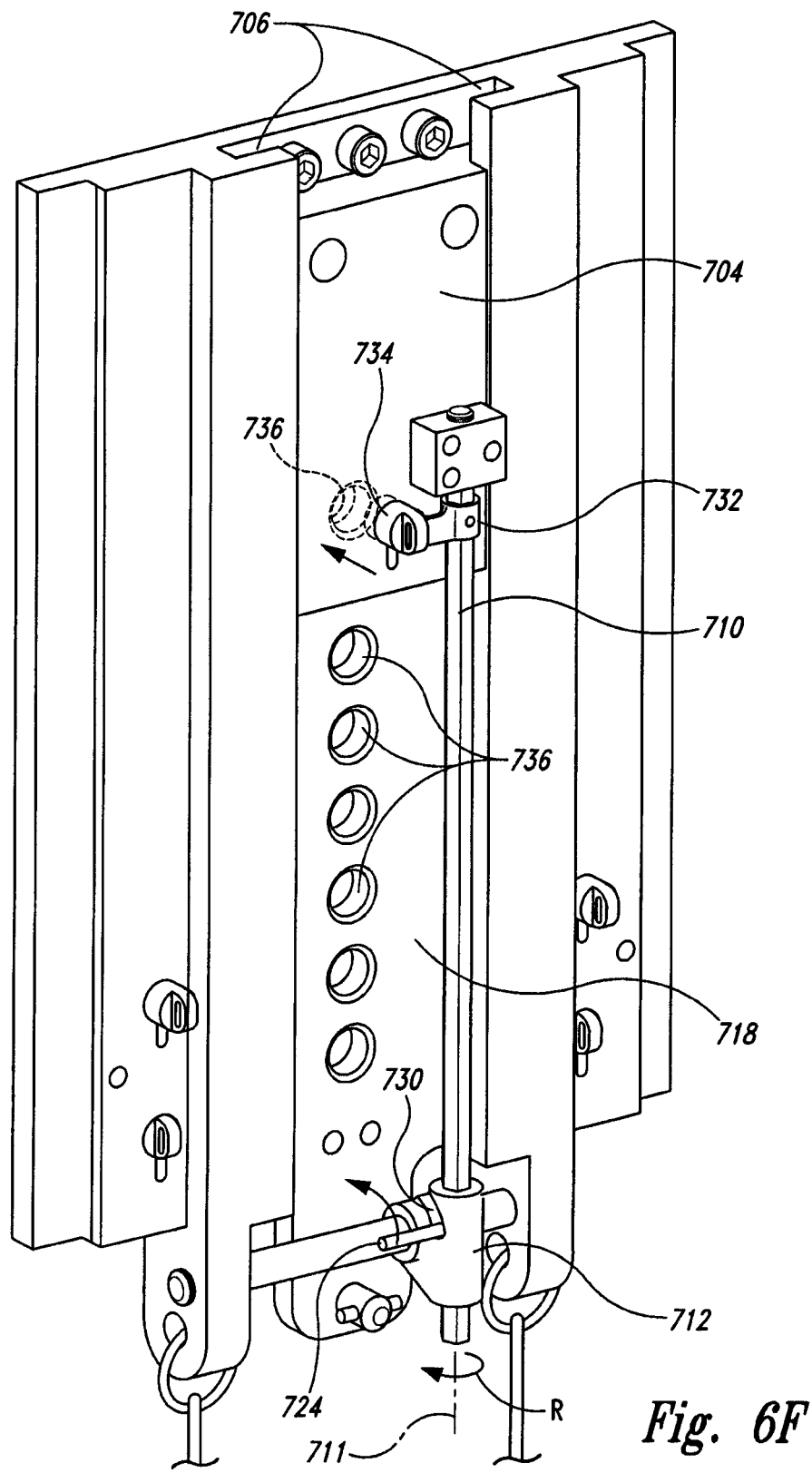

FIGS. 6E and 6F are perspective views illustrating operation of the guide fitting 712 in accordance with an embodiment of the disclosure. More specifically, FIG. 6E is an enlarged perspective view of a portion of the pretensioning system 700 with the guide fitting 712 removed for clarity, and FIG. 6F is another perspective view of this area with the release arm 722 removed for clarity. A pin 724 (FIG. 6E) extends outwardly from the release arm 722, and is movably received in an adjacent track 730 in the guide fitting 712 (FIG. 6F). As the actuator 768 drives the release arm 722 upwardly in response to downward movement of the seat 450, the pin 724 moves in an arc and causes the guide fitting 712 to rotate about the longitudinal axis 711 of the guide member 710. In this embodiment, the guide member 710 can have a hexagonal or other polygonal cross-sectional shape that enables the guide fitting 712 to rotate the guide member 710 as the guide fitting 712 rotates.

As shown in FIG. 6F, a link or arm 732 extends outwardly from an upper portion of the guide member 710, and has a distal end coupled to a lock pin or pawl 734. As the guide member 710 rotates about the axis 711 in the direction R, the arm 732 drives the pawl 734 into one of a series of holes 736 in the second carrier plate 718. This effectively locks the first carrier plate 704 to the second carrier plate 718. Accordingly, upward rotation of the release arm 722 about the shaft 714 locks the first carrier plate 704 to the second carrier plate 718 and at the same time releases the second carrier plate 718 from the base plate 702, so that the second carrier plate 718 can slide downwardly in the second tracks 720 under force of the tension springs 766 and pretension the harness 416.

As the second carrier plate 718 moves downward, spring-loaded pins 726 having beveled end portions 727 cam over corresponding rows of holes 728 formed in the base plate 702. The beveled end portions 727 enable the pins to move in and out of the holes 728 as the second carrier plate moves 718 downward, but because of the direction of the beveled surfaces 727, the spring-loaded pins 726 act like a ratchet mechanism and engage the holes 728 and prevent upward movement of the second carrier plate 718. This effectively locks the second carrier plate 718 against upward movement with pretension on the harness 416. Subsequently, the pins 726 can be manually or otherwise retracted from the holes 728 and the second carrier plate 718 can be moved back up into position with the springs 766 preloaded in tension.

Figure 7:
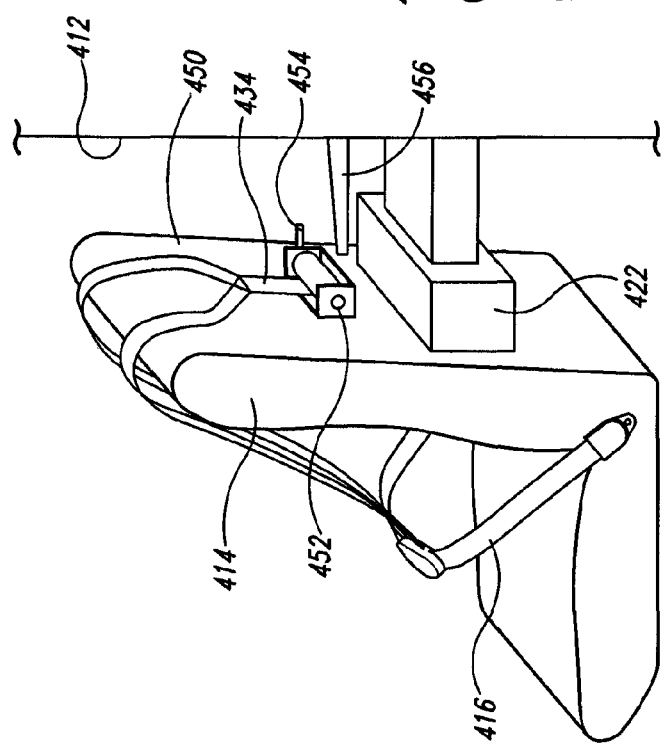
FIG. 7 is a perspective view of a seat harness pretensioner configured in accordance with yet another embodiment of the present disclosure.

FIG. 7 is a perspective view of a seat harness pretensioner configured in accordance with yet another embodiment of the disclosure. In this embodiment, the lower end of the tensioning belt 434 is attached onto a retractor or spool 452 on the back surface 450 of the seat 414. A tensioned coil spring exerts torque on the spool. Suitable torsion spring/spool arrangements are known in the art. A trigger element 454 holds the spool 452 from rotating against the torque exerted by the spring. The trigger element 454 is aligned with a trigger arm 456 fixedly attached to the vehicle body 412. As the stroking device 422 moves the seat down during a detonation, the trigger element 454 comes into contact with the trigger arm 456. This causes the trigger element 454 to release the spool. The spool then rapidly winds up the tensioning belt 434, pretensioning the harness. A ratchet or other one way device may be used to prevent the spool 452 from unwinding after the tensioning belt 434 has been wound up. The spool 452, spring, ratchet, trigger element 454 and trigger arm 456 form means for pretensioning the harness with downward movement of the seat.

Figure 8:
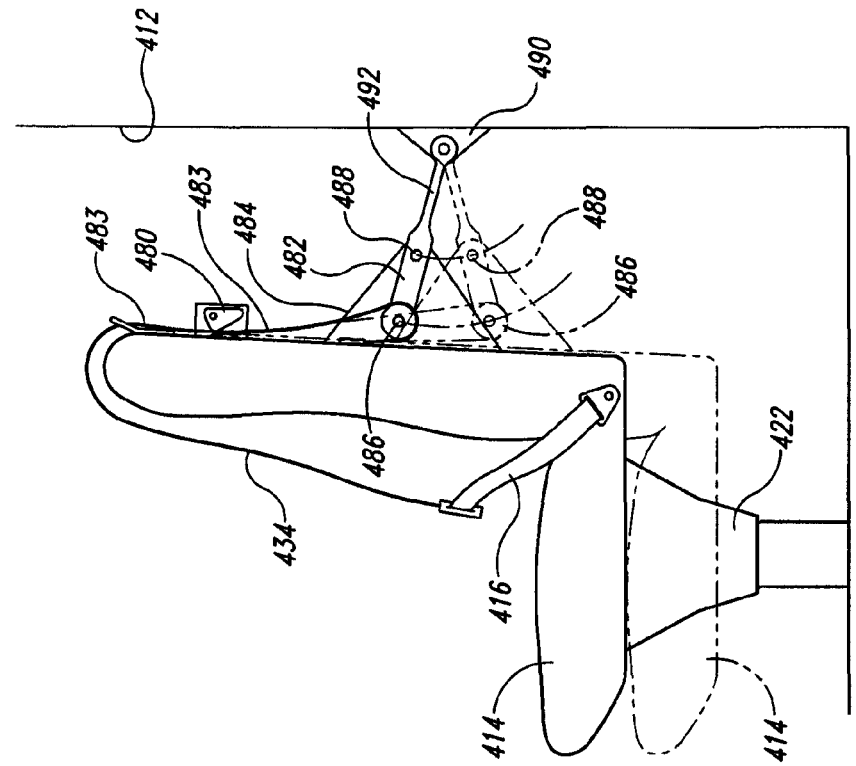
FIG. 8 is a schematic side view of a seat harness pretensioner configured in accordance with a further embodiment of the present disclosure.

FIG. 8 is a schematic side view of another embodiment having a pivot arm 482 with one end pivotally attached to a pivot block 490 on the vehicle body 412. The pivot arm 482 is also pivotally attached to a seat pivot block 484 on the back of the seat 414. A roller 486 is attached onto the other end (or front end) of the pivot arm 482. A web, belt or other link 483 connects to the harness 434, passes through a one-way webbing adjuster 480, extends around the roller 486, and is tied off on the seat back or the seat pivot block 484. The one-way webbing adjuster 480 allows only downward (harness tightening) movement of the belt 483. The portion or section of the pivot arm 482 in front of the pivot joint 488 on the seat pivot block 84 may be substantially rigid. The section of the pivot arm 482 extending between the pivot joint 488 and the vehicle pivot block 490 may be flexible, or at least partially flexible, to provide a torque deforming feature which limits the load applied to the harness 434.

FIG. 8 shows the normal positions of the elements in solid lines. The positions of the elements during an impact, detonation, etc. are shown in dotted lines. In use, during an impact, the seat 414 moves down. This causes the pivot arm 482 to pivot down as shown in dotted lines. The roller 486 pulls the belt 483 downwardly, pretensioning the harness 434. The web adjuster 480 holds the harness 434 in the pretensioned condition by preventing reverse movement of the belt 483. As mentioned above, a rear portion of the pivot arm 482 may be flexible. With this option, the pivot arm 482 bends to limit downward movement of the roller 486. The pretensioning force on the harness 434 may be correspondingly limited. The pivot arm 482 mounted as described provides means for pretensioning the harness 434 with downward movement of the seat.

Figure 10:
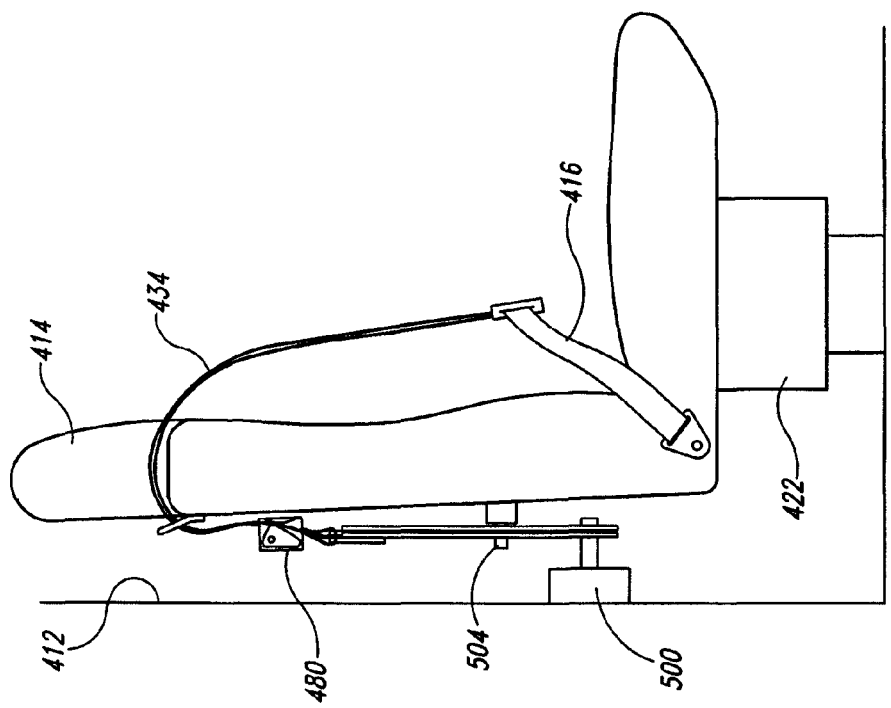
FIG. 10 is a schematic side view of the seat harness pretensioner shown in FIG. 9.
Figure 9:
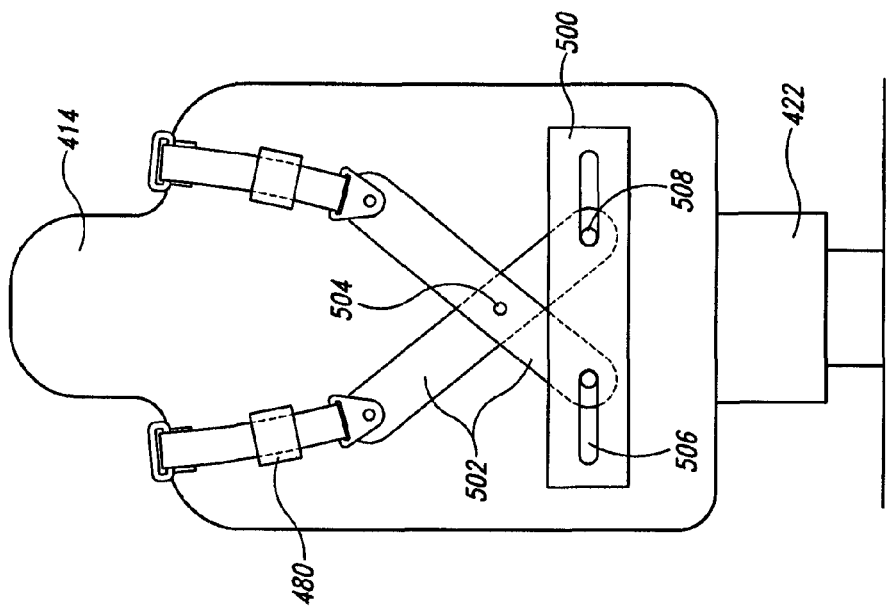
FIG. 9 is a rear schematic view of a seat harness pretensioner configured in accordance with yet another embodiment of the present disclosure.

FIG. 9 is a rear schematic view of a seat harness pretensioner configured in accordance with another embodiment of the disclosure, and FIG. 10 is a schematic side view of the seat harness pretensioner shown in FIG. 9. In the embodiment of FIGS. 9 and 10, a track 500 is mounted on the vehicle body 412. Sliders 508 at the lower ends of links or bars 502 hold the lower ends into slots 506 in the track 500. The slots 506 may be horizontal. The links 502 cross over each other forming an X-shape, and are attached to a seat mounted pivot joint 504. Shoulder belts of the seat harness 416 are attached at or near the upper end of each link 502. Each shoulder belt can pass through a corresponding one-way adjuster 480. The one-way adjusters 480 may be used to prevent reverse belt movement. During an impact, explosion, etc., the seat 414 moves down on the stroking device 422. As this occurs, the seat mounted pivot joint 504 also moves down. This drives the sliders 508 to the outside of the slots 506 in the track 500. The upper ends of the links 502 (the sections above the joint 504) move downwardly and away from each other, pulling the shoulder belts with them. This pretensions the seat harness 416.

The pretensioners shown in FIGS. 1-10 are mechanical designs with no pyrotechnic or electrical components needed. Accordingly, these designs can be efficient to manufacture, install and test. These designs can also be highly reliable and resistant to the harsh operating environments that military vehicles must operate in. Of course, the designs shown in FIGS. 1-10 can be modified to include electrical and/or pyrotechnic elements as well. For example, the trigger pin 464 or other triggering element, and/or movement of the tensioning bar 460, may be electrically or pyrotechnically driven or actuated in response to downward movement of the seat during a detonation beneath a land vehicle or, for example, a hard landing in a helicopter.

Figure 11:
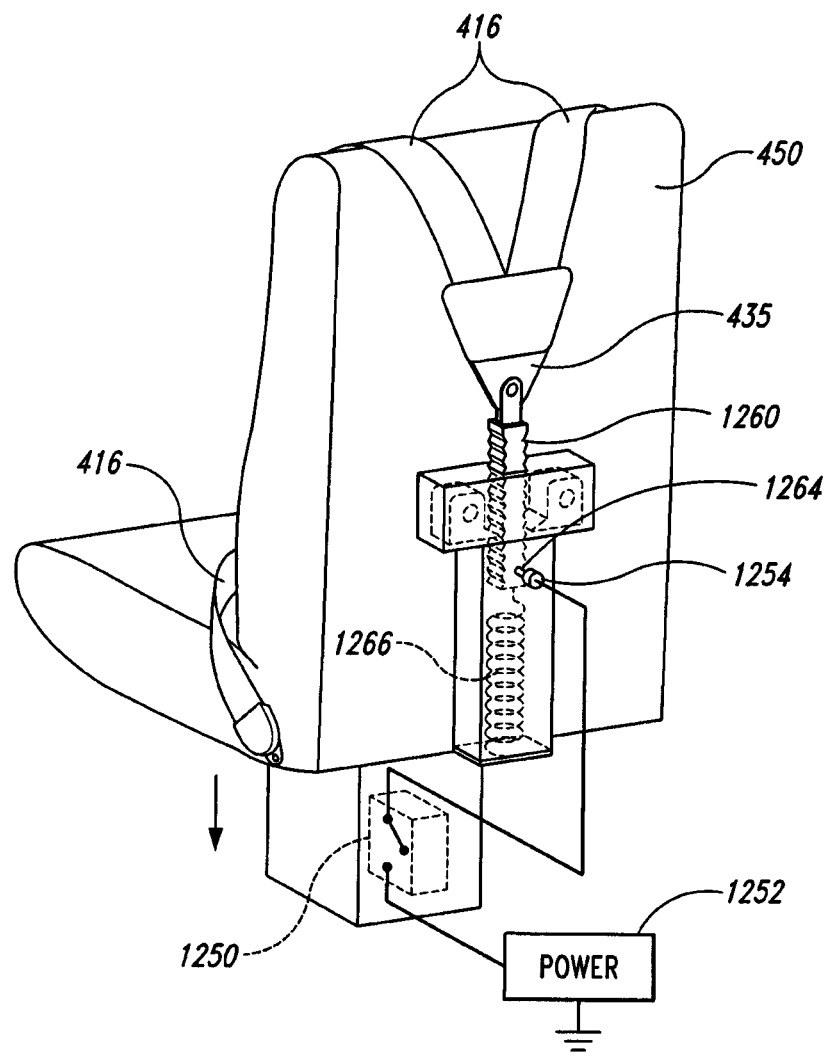
FIG. 11 is a schematic perspective view of a seat harness pretensioner that is electrically actuated in response to seat movement in accordance with a further embodiment of the present disclosure.

FIG. 11, for example, illustrates a harness pretensioning system in which an electronic switch 1250 is closes or is otherwise activated in response to downward movement or stroking of the seat 50. When the switch 1250 closes, power from a power source 1252 (such as a vehicle battery) is provided to a solenoid 1254 which retracts a trigger pin 1264 from a tensioning bar 1260. When the pin 1264 is retracted, a biasing member or tension spring 1266 pulls the tensioning section 35 downwardly and pretensions the harness 16. In other embodiments, the switch 1250 can be replaced by a suitable sensor that senses or detects downward movement of the seat relative to the vehicle body 12 and sends a corresponding signal to the solenoid 1254 or other device (e.g., a pyrotechnic device such as a squib or pin-puller) to release the tensioning bar 1260. In further embodiments, the tensioning bar/spring arrangement can be replaced with and/or supplemented by suitable electric systems for pretensioning the harness 16. Such electric systems can include, for example, an electric powered reel, spool, ratchet, etc.

In one aspect of some of the embodiments disclosed above, the amount of seat harness pretensioning provided by the various pretensioning devices is not proportional to, or otherwise a function of, the amount of downward seat movement. For example, in these embodiments, once the pretensioner has been activated the pretensioner pretensions the seat harness a preset amount (according to, for example, a spring force), regardless of how much the seat strokes downward. In other embodiments, however, the amount of seat harness pretensioning can be a function of, can be proportional to, or otherwise related to the amount of seat movement. One advantage of some of the embodiments described above is that by pretensioning the seat harness, the seat occupant may be drawn more firmly into the seat and in a more favorable orientation to minimize or reduce injury during an explosion, detonation, hard landing, etc.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A seat assembly, comprising:
a seat movably mounted to a vehicle;
a harness attached to the seat;
a slidable member movably mounted to the seat, wherein the slidable member includes an opening, and wherein a portion of the harness movably extends through the opening; and
a coupler mounted to the seat, wherein the coupler translates movement of the seat relative to the vehicle into movement of the slidable member relative to the seat, and wherein the movement of the slidable member increases the tension of the harness.

2. The seat assembly of claim 1, further comprising a first fixed member and a second fixed member, wherein the first fixed member is mounted to the second first member, wherein the second fixed member is mounted to the seat, and wherein the slidable member is movably mounted between the first fixed member and the second fixed member.

3. The seat assembly of claim 2 wherein the slidable member includes a row of teeth, wherein the seat assembly further comprises a ratchet positioned to engage the teeth, wherein the movement of the slidable member relative to the seat is in a first direction, and wherein the ratchet maintains tension in the harness by preventing movement of the slidable member relative to the seat in a second direction opposite to the first direction.

4. The seat assembly of claim 1, further comprising a fixed member mounted to the seat, wherein the slidable member is movably mounted between the seat and the fixed member, and wherein the movement of the slidable member relative to the seat pulls a portion of the harness between the fixed member and the seat.

5. The seat assembly of claim 1, further comprising a load limiter positioned to limit movement of the slidable member relative to the seat to limit an amount of tension in the harness.

6. The seat assembly of claim 1 wherein the movement of the slidable member relative to the seat is in a first direction, the seat assembly further comprising a ratchet system positioned to prevent movement of the slidable member in a second direction opposite to the first direction.

7. The seat assembly of claim 1, further comprising a fixed member mounted to the seat, wherein the slidable member is movably mounted between the seat and the fixed member, wherein the harness is attached to an anchor point on the fixed member, and wherein the harness extends from the anchor point and through the opening in the slidable member.

8. The seat assembly of claim 1 wherein the coupler comprises a lever having a first end portion operably coupled to a fixed portion of the vehicle and a second end portion operably coupled to the slidable member, wherein the movement of the seat relative to the vehicle rotates the lever and moves the slidable member relative to the seat.

9. A seat assembly, comprising:
a seat movably mounted to a vehicle;
a fixed member mounted to the seat and spaced apart from the seat to form a slot therebetween;

a harness having an end portion attached to the fixed member;

a slidable member movably positioned in the slot between the seat and the fixed member, wherein the slidable member includes an opening, and wherein a portion of the harness extends through the opening; and a lever pivotally mounted to the fixed member and positioned to interact with a fixed portion of the vehicle upon downward movement of the seat, wherein interaction rotates the lever against the slidable member thereby moving the slidable member downward and drawing a portion of the harness into the slot to tension the harness.

10. The seat assembly of claim 9 wherein the opening is a first opening, wherein the fixed member includes a second opening, and wherein the lever extends through the second opening to engage the slidable member.

11. The seat assembly of claim 9, further comprising a ratchet positioned to prevent upward motion of the slidable member.

12. The seat assembly of claim 11 wherein the slidable member includes a plurality of teeth positioned to engage the ratchet.

13. The seat assembly of claim 9 wherein the fixed member is a first fixed member, wherein the seat harness pretensioner further comprises a second fixed member mounted to the seat, wherein the first fixed member is mounted to the seat via the second fixed member, and wherein the slot is positioned between the first fixed member and the second fixed member.

14. The seat assembly of claim 9, further comprising a stroking mechanism, and wherein the seat is movably mounted to the vehicle via the stroking mechanism.

* * * * *